(12) United States Patent
Muratani et al.

(10) Patent No.: US 7,599,127 B2
(45) Date of Patent: Oct. 6, 2009

(54) ZOOM LENS SYSTEM

(75) Inventors: Mami Muratani, Tokyo (JP); Sayako Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 69 days.

(21) Appl. No.: 11/526,745

(22) Filed: Sep. 26, 2006

(65) Prior Publication Data

US 2007/0070518 A1 Mar. 29, 2007

(30) Foreign Application Priority Data

Sep. 28, 2005 (JP) ............................. 2005-282904

(51) Int. Cl.
*G02B 15/14* (2006.01)

(52) U.S. Cl. ...................................... 359/691

(58) Field of Classification Search ................... 359/691
See application file for complete search history.

(56) References Cited

U.S. PATENT DOCUMENTS

| | | | |
|---|---|---|---|
| 5,539,581 A | 7/1996 | Sato | |
| 6,275,342 B1 * | 8/2001 | Sakamoto et al. | ........... 359/691 |
| 6,487,024 B2 | 11/2002 | Sato | |
| 6,762,887 B2 | 7/2004 | Tomioka | |
| 2003/0184876 A1 | 10/2003 | Tomioka | |
| 2004/0015890 A1 | 1/2004 | Wong et al. | |
| 2005/0063069 A1 * | 3/2005 | Nishimura | ................... 359/680 |
| 2006/0007559 A1 | 1/2006 | Sato | |

FOREIGN PATENT DOCUMENTS

| | | |
|---|---|---|
| JP | 10-206733 A | 8/1998 |
| JP | 2003-287677 A | 10/2003 |

* cited by examiner

*Primary Examiner*—William C Choi
(74) *Attorney, Agent, or Firm*—Miles & Stockbridge P.C.

(57) ABSTRACT

Providing a zoom lens system having excellently correcting various aberrations with accomplishing to be compact, lightweight, and slim upon being retracted. The system is composed of, in order from an object, a first group having negative refractive power, and a second group having positive refractive power. Upon zooming from a wide-angle end state to a telephoto end state, a distance between the first group and the second group varies. The first group is composed of two lens elements which are, in order from the object, a negative lens having a concave surface facing an image, and a positive lens. The second group consists of three lens elements or less and includes, in order from the object, a positive lens, an aperture stop for defining an f-number, and a negative lens component including a negative lens and disposed to the image side of the aperture stop. Given conditions are satisfied.

22 Claims, 21 Drawing Sheets

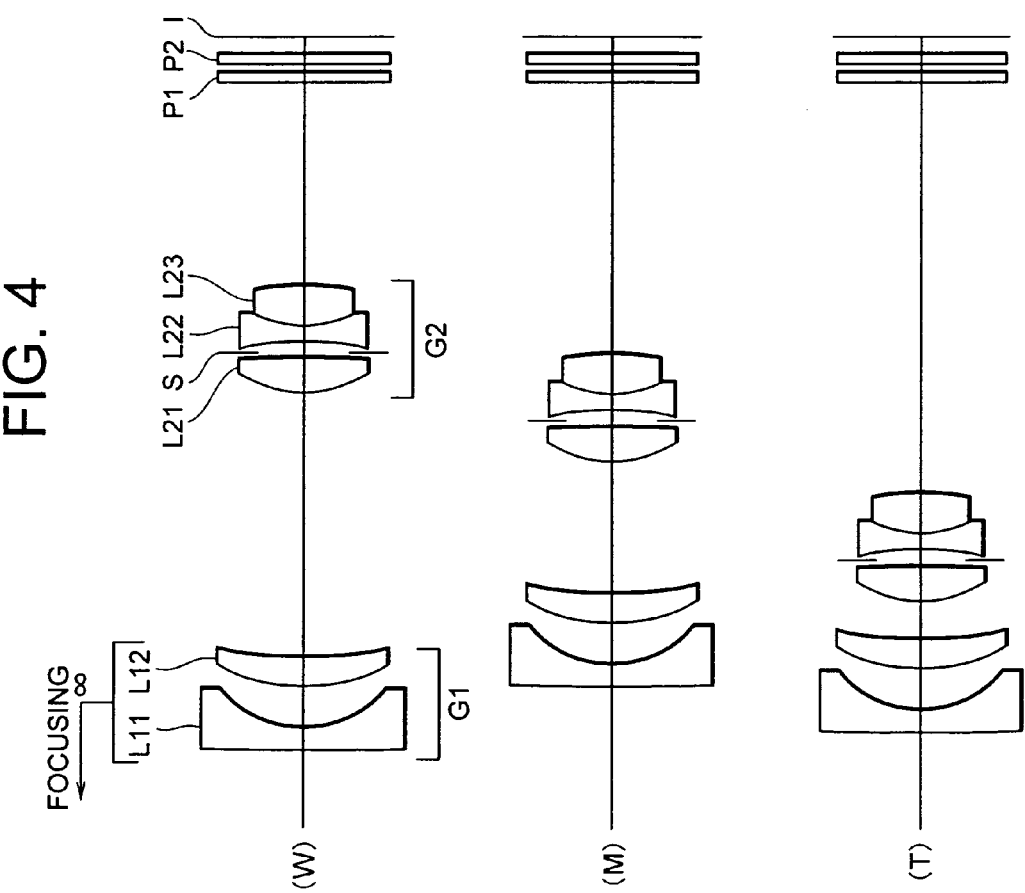

FIG. 6A
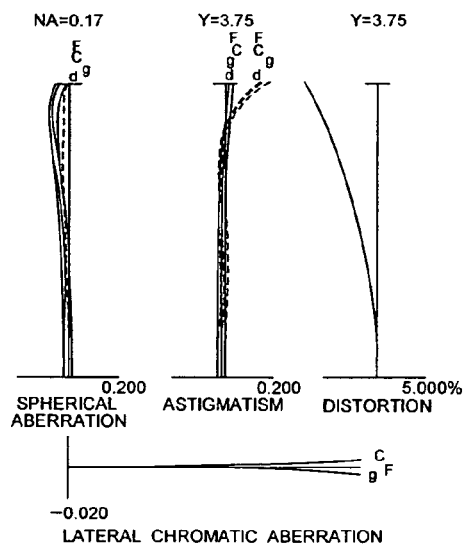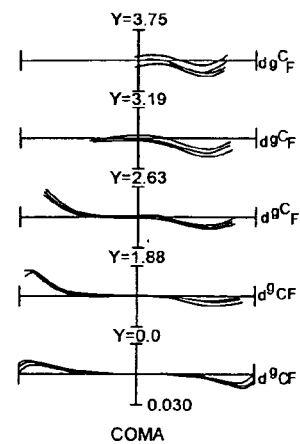
FIG. 6B
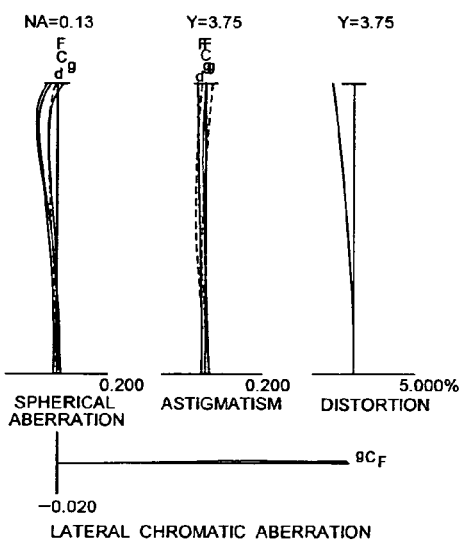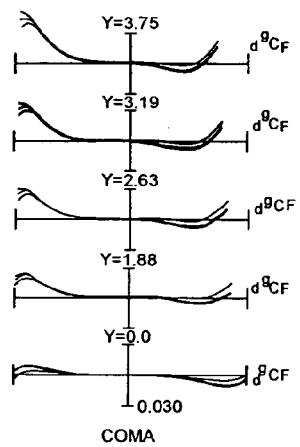
FIG. 6C
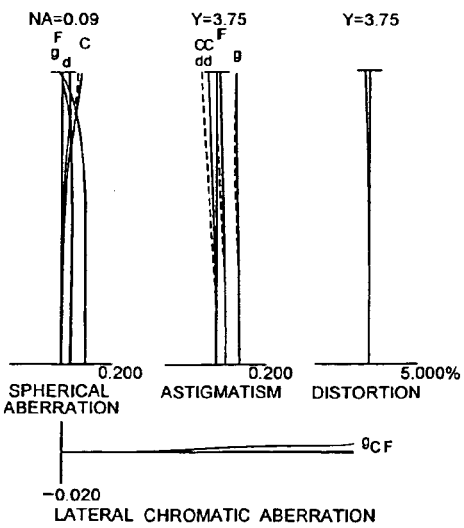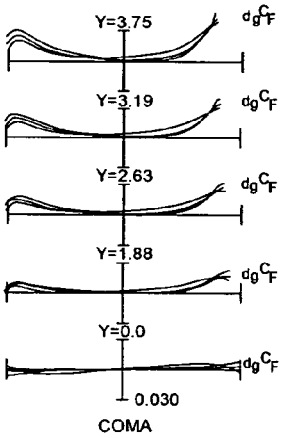

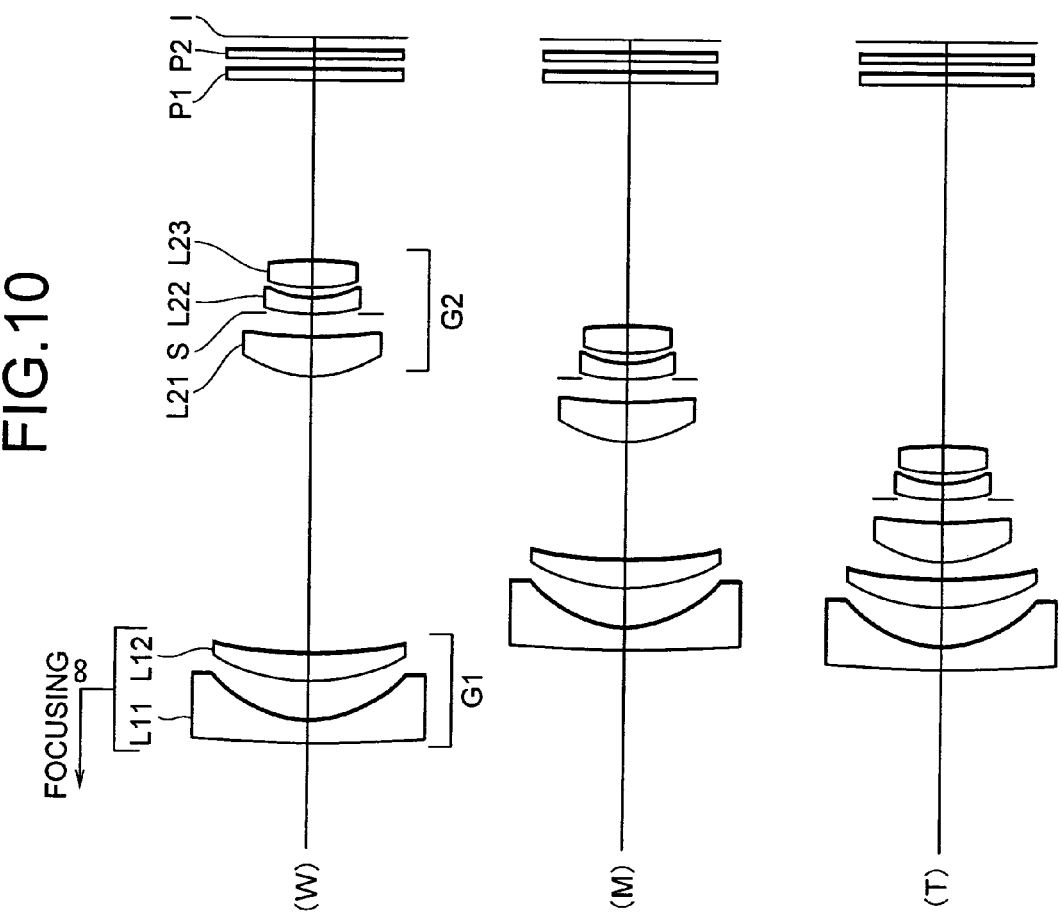

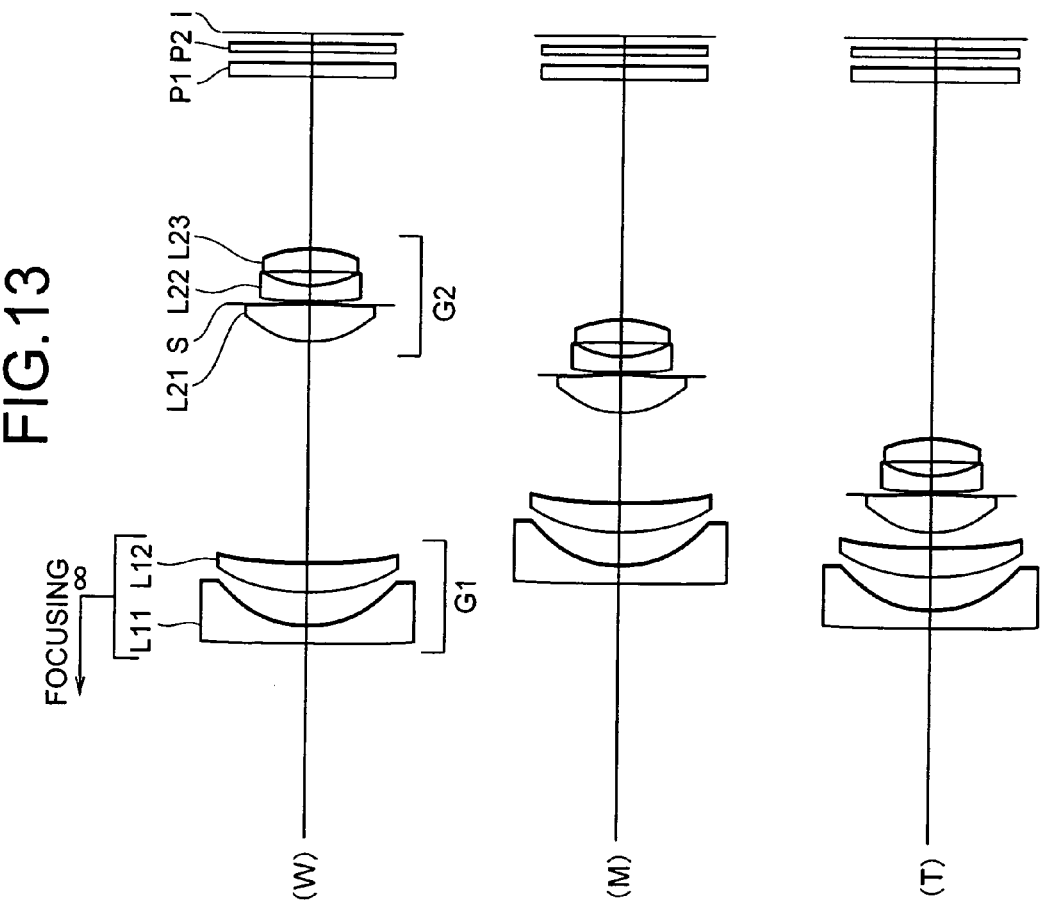

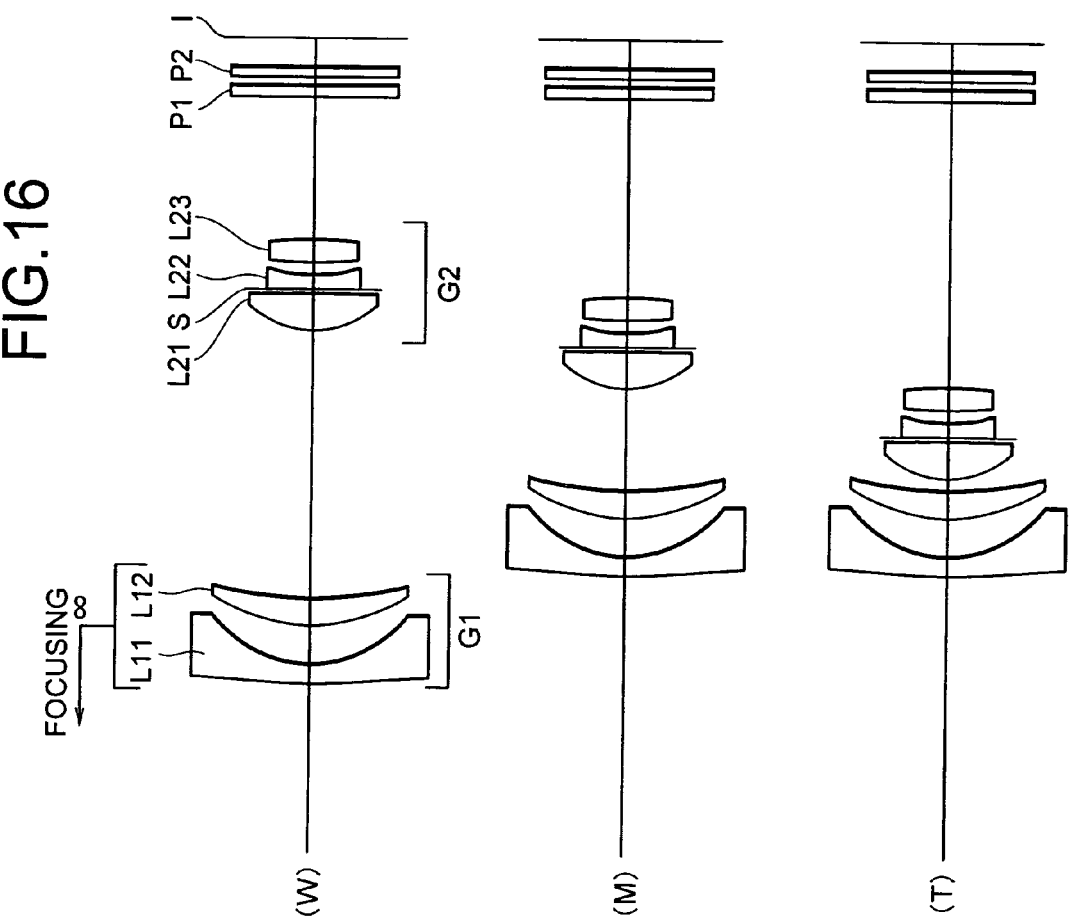

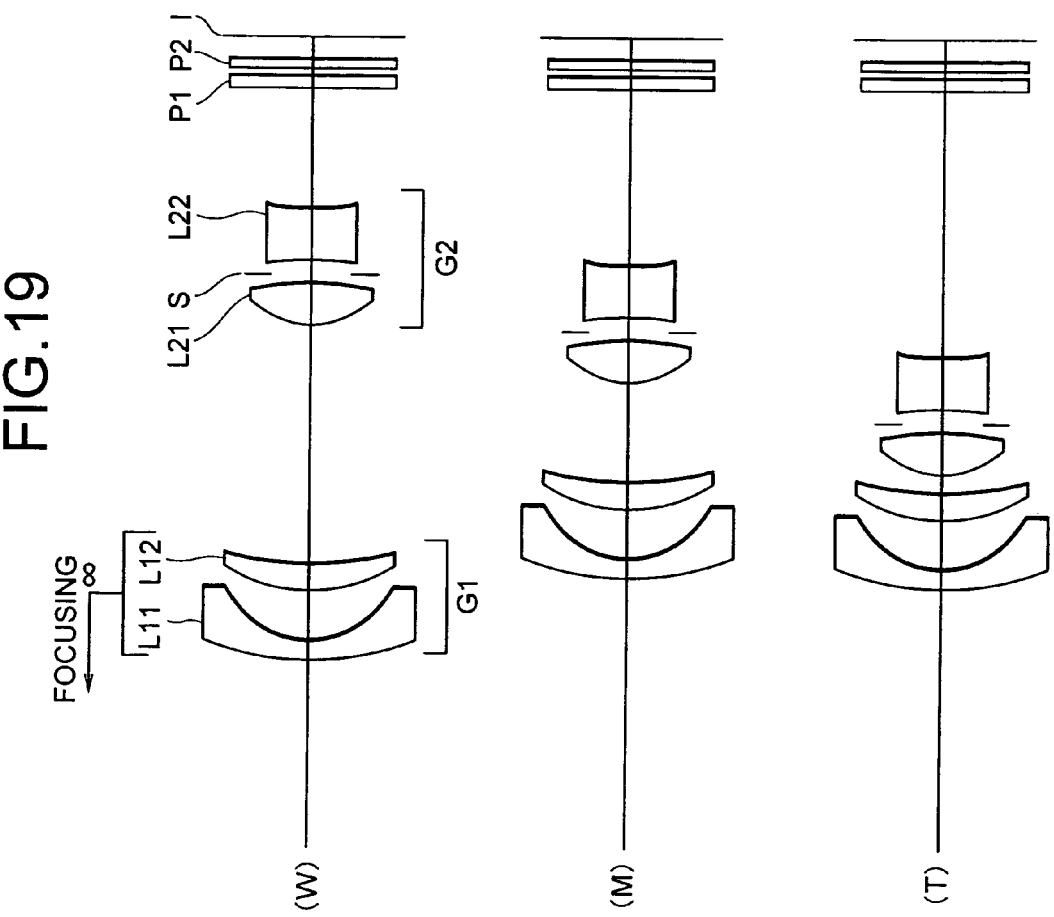

ZOOM LENS SYSTEM

The disclosure of the following priority application is herein incorporated by reference:

Japanese Patent Application No. 2005-282904 filed on Sep. 28, 2005.

BACKGROUND OF THE INVENTION

1. Field of the Invention

The present invention relates to a zoom lens system suitable for a camera.

2. Related Background Art

With increasing miniaturizing trend of a digital camera, an optical system loaded thereon has strongly been required to be compact and lightweight to increase portability. With increasing integration of a solid-state imaging device, there has been required a zoom lens system capable of providing high contrast with respect to a higher spatial frequency. Japanese Patent Application Laid-Open No. 2003-287677 discloses a negative-leading zoom lens system suitable for a compact digital camera using such a solid-state imaging device.

However, a zoom lens system disclosed in Japanese Patent Application Laid-Open No. 2003-287677 has relatively large number of lens elements of eight, so that it becomes difficult to accomplish to be compact, lightweight, and slim when the zoom lens system is accommodated in the camera body.

SUMMARY OF THE INVENTION

The present invention is made in view of the aforementioned problems and has an object to provide a zoom lens system excellently correcting various aberrations with accomplishing to be compact, lightweight, and slim upon being retracted.

According to a first aspect of the present invention, there is provided a zoom lens system composed of, in order from an object, a first lens group having negative refractive power, and a second lens group having positive refractive power. Upon zooming from a wide-angle end state to a telephoto end state, a distance between the first lens group and the second lens group varies. The first lens group is composed of two lens elements which are, in order from the object, a negative lens having a concave surface facing an image, and a positive lens. The second lens group consists of three lens elements or less and includes, in order from the object, a positive lens, an aperture stop for defining an f-number, and a negative lens component including a negative lens and disposed to the image side of the aperture stop. The following conditional expression (1) is satisfied:

$$-0.05 < Da/fw < 0.5 \quad (1)$$

where Da denotes a distance along the optical axis between the image side surface of the most object side positive lens in the second lens group and the aperture stop, and fw denotes a focal length of the zoom lens system in the wide-angle end state.

In the first aspect of the present invention, it is preferable that a positive lens is disposed to the image side of the negative lens in the negative lens component.

In the first aspect of the present invention, the following conditional expression (2) is preferably satisfied:

$$-0.6 < fF/fR < 0.3 \quad (2)$$

where fF denotes a focal length of the most object side positive lens in the second lens group, and fR denotes a combined focal length of the lenses disposed from the negative lens component in the second lens group to the image plane.

In the first aspect of the present invention, the following conditional expressions (3) and (4) are preferably satisfied:

$$1.68 < nd \quad (3)$$

$$vd < 40 \quad (4)$$

where nd denotes refractive index of the negative lens in the negative lens component at d-line (wavelength λ=587.6 nm), and vd denotes Abbe number of the negative lens in the negative lens component at d-line (wavelength λ=587.6 nm).

In the first aspect of the present invention, it is preferable that at least one aspherical surface is included in both of the first lens group and the second lens group.

In the first aspect of the present invention, it is preferable that focusing is carried out by the first lens group.

In the first aspect of the present invention, it is preferable that the negative lens component is a single negative lens.

In the first aspect of the present invention, it is preferable that the negative lens component is a cemented lens constructed by, in order from the object, a negative lens cemented with a positive lens.

According to a second aspect of the present invention, there is provided a zoom lens system composed of, in order from an object, a first lens group having negative refractive power, and a second lens group having positive refractive power. Upon zooming from a wide-angle end state to a telephoto end state, a distance between the first lens group and the second lens group varies. The first lens group is composed of two lens elements which are, in order from the object, a negative lens having a concave surface facing an image, and a positive lens. The second lens group includes, in order from the object, a positive lens, an aperture stop for defining an f-number, and a negative lens component composed of a single negative lens and disposed to the image side of the aperture stop. The following conditional expression (1) is satisfied:

$$-0.05 < Da/fw < 0.5 \quad (1)$$

where Da denotes a distance along the optical axis between the image side surface of the most object side positive lens in the second lens group and the aperture stop, and fw denotes a focal length of the zoom lens system in the wide-angle end state.

In the second aspect of the present invention, it is preferable that a positive lens is disposed to the image side of the negative lens in the negative lens component.

In the second aspect of the present invention, the following conditional expression (2) is preferably satisfied:

$$-0.6 < fF/fR < 0.3 \quad (2)$$

where fF denotes a focal length of the most object side positive lens in the second lens group, and fR denotes a combined focal length of the lenses disposed from the negative lens component to the image plane.

In the second aspect of the present invention, the following conditional expressions (3) and (4) are preferably satisfied:

$$1.68 < nd \quad (3)$$

$$vd < 40 \quad (4)$$

where nd denotes refractive index of the negative lens in the negative lens component at d-line (wavelength λ=587.6 nm), and νd denotes Abbe number of the negative lens in the negative lens component at d-line (wavelength λ=587.6 nm).

In the second aspect of the present invention, it is preferable that at least one aspherical surface is included in both of the first lens group and the second lens group.

In the second aspect of the present invention, it is preferable that focusing is carried out by the first lens group.

According to a third aspect of the present invention, there is provided a method for forming an image of an object and varying a focal length of a zoom lens system that includes, in order from the object, a first lens group having negative refractive power, and a second lens group having positive refractive power, comprising steps of:

varying the focal length from a wide-angle end state to a telephoto end state by moving a distance between the first lens group and the second lens group, providing the first lens group composed of two lens elements which are, in order from the object, a negative lens having a concave surface facing the image, and a positive lens, providing the second lens group which consists of three lens elements or less and includes, in order from the object, a positive lens, an aperture stop for defining an f-number, and a negative lens component including a negative lens and disposed to the image side of the aperture stop, and satisfying the following conditional expression (1):

$$-0.05 < Da/fw < 0.5 \quad (1)$$

where Da denotes a distance along the optical axis between the image side surface of the most object side positive lens in the second lens group and the aperture stop, and fw denotes a focal length of the zoom lens system in the wide-angle end state.

According to a fourth aspect of the present invention, there is provided a method for forming an image of an object and varying a focal length of a zoom lens system that includes, in order from the object, a first lens group having negative refractive power, and a second lens group having positive refractive power, comprising steps of:

varying the focal length from a wide-angle end state to a telephoto end state by moving a distance between the first lens group and the second lens group, providing the first lens group composed of two lens elements which are, in order from the object, a negative lens having a concave surface facing the image, and a positive lens, providing the second lens group which includes, in order from the object, a positive lens, an aperture stop for defining an f-number, and a negative lens component composed of a single negative lens and disposed to the image side of the aperture stop, and satisfying the following conditional expression (1):

$$-0.05 < Da/fw < 0.5 \quad (1)$$

where Da denotes a distance along the optical axis between the image side surface of the most object side positive lens in the second lens group and the aperture stop, and fw denotes a focal length of the zoom lens system in the wide-angle end state.

Other features and advantages according to the present invention will be readily understood from the detailed description of the most preferred embodiments in conjunction with the accompanying drawings.

BRIEF DESCRIPTION OF THE DRAWINGS

FIGS. 2A, 2B, and 2C are graphs showing various aberrations of the zoom lens system according to Example 1 focusing on infinity in which FIG. 2A shows various aberrations in the wide-angle end state, FIG. 2B shows various aberrations in the intermediate focal length state, and FIG. 2C shows various aberrations in the telephoto end state.

FIGS. 3A, 3B, and 3C are graphs showing various aberrations of the zoom lens system according to Example 1 focusing on a close object in which FIG. 3A shows various aberrations in the wide-angle end state, FIG. 3B shows various aberrations in the intermediate focal length state, and FIG. 3C shows various aberrations in the telephoto end state.

FIG. 4 is a diagram showing a lens configuration of a zoom lens system according to Example 2 of the present application in which W shows a wide-angle end state, M shows an inter mediate focal length state, and T shows a telephoto end state.

FIGS. 5A, 5B, and 5C are graphs showing various aberrations of the zoom lens system according to Example 2 focusing on infinity in which FIG. 5A shows various aberrations in the wide-angle end state, FIG. 5B shows various aberrations in the intermediate focal length state, and FIG. 5C shows various aberrations in the telephoto end state.

FIGS. 6A, 6B, and 6C are graphs showing various aberrations of the zoom lens system according to Example 2 focusing on a close object in which FIG. 6A shows various aberrations in the wide-angle end state, FIG. 6B shows various aberrations in the intermediate focal length state, and FIG. 6C shows various aberrations in the telephoto end state.

FIGS. 8A, 8B, and 8C are graphs showing various aberrations of the zoom lens system according to Example 3 focusing on infinity in which FIG. 8A shows various aberrations in the wide-angle end state, FIG. 8B shows various aberrations in the intermediate focal length state, and FIG. 8C shows various aberrations in the telephoto end state.

FIGS. 9A, 9B, and 9C are graphs showing various aberrations of the zoom lens system according to Example 3 focusing on a close object in which FIG. 9A shows various aberrations in the wide-angle end state, FIG. 9B shows various aberrations in the intermediate focal length state, and FIG. 9C shows various aberrations in the telephoto end state.

FIG. 10 is a diagram showing a lens configuration of a zoom lens system according to Example 4 of the present application in which W shows a wide-angle end state, M shows an inter mediate focal length state, and T shows a telephoto end state.

FIGS. 11A, 11B, and 11C are graphs showing various aberrations of the zoom lens system according to Example 4 focusing on infinity in which FIG. 11A shows various aberrations in the wide-angle end state, FIG. 11B shows various aberrations in the intermediate focal length state, and FIG. 11C shows various aberrations in the telephoto end state.

FIGS. 12A, 12B, and 12C are graphs showing various aberrations of the zoom lens system according to Example 4 focusing on a close object in which FIG. 12A shows various aberrations in the wide-angle end state, FIG. 12B shows various aberrations in the intermediate focal length state, and FIG. 12C shows various aberrations in the telephoto end state.

FIG. 13 is a diagram showing a lens configuration of a zoom lens system according to Example 5 of the present application in which W shows a wide-angle end state, M shows an inter mediate focal length state, and T shows a telephoto end state.

FIGS. 14A, 14B, and 14C are graphs showing various aberrations of the zoom lens system according to Example 5 focusing on infinity in which FIG. 14A shows various aberrations in the wide-angle end state, FIG. 14B shows various aberrations in the intermediate focal length state, and FIG. 14C shows various aberrations in the telephoto end state.

FIGS. 15A, 15B, and 15C are graphs showing various aberrations of the zoom lens system according to Example 5 focusing on a close object in which FIG. 15A shows various aberrations in the wide-angle end state, FIG. 15B shows various aberrations in the intermediate focal length state, and FIG. 15C shows various aberrations in the telephoto end state.

FIG. 16 is a diagram showing a lens configuration of a zoom lens system according to Example 6 of the present application in which W shows a wide-angle end state, M shows an inter mediate focal length state, and T shows a telephoto end state.

FIGS. 17A, 17B, and 17C are graphs showing various aberrations of the zoom lens system according to Example 6 focusing on infinity in which FIG. 17A shows various aberrations in the wide-angle end state, FIG. 17B shows various aberrations in the intermediate focal length state, and FIG. 17C shows various aberrations in the telephoto end state.

FIGS. 18A, 18B, and 18C are graphs showing various aberrations of the zoom lens system according to Example 6 focusing on a close object in which FIG. 18A shows various aberrations in the wide-angle end state, FIG. 18B shows various aberrations in the intermediate focal length state, and FIG. 18C shows various aberrations in the telephoto end state.

FIG. 19 is a diagram showing a lens configuration of a zoom lens system according to Example 7 of the present application in which W shows a wide-angle end state, M shows an intermediate focal length state, and T shows a telephoto end state.

FIGS. 20A, 20B, and 20C are graphs showing various aberrations of the zoom lens system according to Example 7 focusing on infinity in which FIG. 20A shows various aberrations in the wide-angle end state, FIG. 20B shows various aberrations in the intermediate focal length state, and FIG. 20C shows various aberrations in the telephoto end state.

FIGS. 21A, 21B, and 21C are graphs showing various aberrations of the zoom lens system according to Example 7 focusing on a close object in which FIG. 21A shows various aberrations in the wide-angle end state, FIG. 21B shows various aberrations in the intermediate focal length state, and FIG. 21C shows various aberrations in the telephoto end state.

DESCRIPTION OF THE MOST PREFERRED EMBODIMENTS

Figure 1:
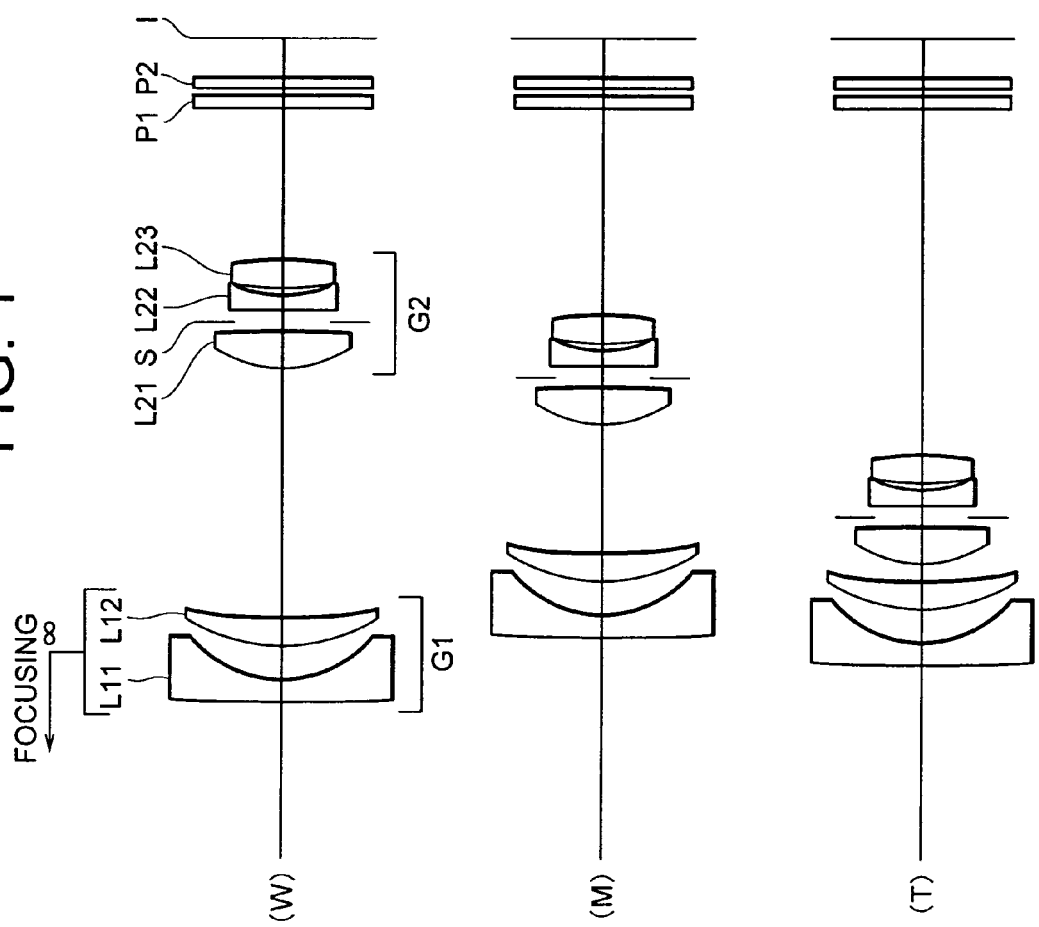
FIG. 1 is a diagram showing a lens configuration of a zoom lens system according to Example 1 of the present application in which W shows a wide-angle end state, M shows an inter mediate focal length state, and T shows a telephoto end state.

Embodiments according to the present application will be explained below.

A zoom lens system according to the embodiment of the present application is composed of, in order from an object, a first lens group having negative refractive power, and a second lens group having positive refractive power. Upon zooming from a wide-angle end state to a telephoto end state, a distance between the first lens group and the second lens group varies. The first lens group is composed of two lenses which are, in order from the object, a negative lens having a concave surface facing an image, and a positive lens. The second lens group includes, in order from the object, a positive lens, an aperture stop for defining an f-number, and a negative lens component including a negative lens and disposed to the image side of the aperture stop.

In a conventional negative-positive-positive three-lens-group zoom lens system, since the third lens group has a function to reduce power of each lens group, the focal lengths of the first lens group and the second lens group tend to become large. As a result, moving amounts of the first lens group and the second lens group become large, so that the dimension of the lens barrel including the diameter of the front lens and the total length of the zoom lens system become large.

A zoom lens system according to the embodiment of the present application is a two-lens-group zoom lens system which is relatively difficult to correct aberrations due to short focal length of each lens group in comparison with a conventional three-lens-group zoom lens system. However, with disposing the aperture stop in the second lens group, it becomes possible to excellently correct aberrations and to accomplish miniaturization and simplification of the mechanical construction. Moreover, when the aperture stop is disposed in the second lens group, since moving amount of the second lens group upon zooming can be small in the two-lens-group zoom lens system, variation in the f-number upon zooming can be smaller in the two-lens-group zoom lens system than in the conventional three-lens-group zoom lens system.

The most object side positive lens in the second lens group tends to direct a strong convex surface toward the object, and the most image side positive lens in the first lens group tends to become a meniscus shape having a concave surface facing the image. Accordingly, when the aperture stop is disposed to the object side of the second lens group, a distance between the first lens group and the second lens group has to be sufficiently expanded, so that it is disadvantageous for miniaturization. The zoom lens system according to the embodiment makes it possible to accomplish compactness to narrower the distance between the first lens group and the second lens group by means of disposing the aperture stop in the second lens group.

Moreover, in order to correct spherical aberration and upper coma with good balance, the negative lens component in the second lens group tends to become a negative meniscus shape having large curvature to the image side, so that a deviation angle becomes large in accordance with the curvature. When the aperture stop for defining an f-number is disposed to the object side of the second lens group as shown in a conventional case, in order to suppress outer coma, the most image side lens surface of the negative lens in the second lens group has to be an aspherical surface. In the zoom lens system according to the embodiment of the present application, the aperture stop for defining an f-number is disposed in the vicinity of the negative lens component in the second lens group, the height of the paraxial ray can be kept lower, so that generation of high order aberrations can be suppressed and excellent correction of aberration can be obtained without introducing an aspherical surface to the most image side lens surface of the second lens group.

In the zoom lens system according to the embodiment of the present application, the following conditional expression (1) is preferably satisfied:

$$-0.05 < Da/fw < 0.5 \qquad (1)$$

where Da denotes a distance along the optical axis between the image side surface of the most object side positive lens in the second lens group and the aperture stop, and fw denotes a focal length of the zoom lens system in the wide-angle end state.

Conditional expression (1) defines a ratio of a distance along the optical axis between the image side surface of the most object side positive lens in the second lens group and the aperture stop to a focal length of the zoom lens system in the wide-angle end state.

When the ratio Da/fw is equal to or falls below the lower limit of conditional expression (1), the image side surface of the positive lens in the second lens group and the aperture stop interfere with each other, so that the aperture stop cannot be disposed.

On the other hand, when the ratio Da/fw is equal to or exceeds the upper limit of conditional expression (1), the distance between the first lens group and the second lens group in the wide-angle end state becomes large, and the total length of the zoom lens system also becomes large, so that it becomes difficult to make the zoom lens system compact. When the zoom lens system has restrictions on the distance between the lens groups or the total lens length, excellent correction of aberrations cannot be carried out.

In order to secure the effect of the present invention, it is preferable to set the lower limit of conditional expression (1) to 0.00. In order to secure the effect of the present invention, it is preferable to set the upper limit of conditional expression (1) to 0.30. In order to further secure the effect of the present invention, it is more preferable to set the upper limit of conditional expression (1) to 0.20. The aperture stop may be either a fixed stop or a variable stop. A fixed stop is more preferable, for the material thereof can be made thinner.

In the zoom lens system according to the embodiment of the present application, a positive lens is preferably disposed to the image side of the negative lens in the negative lens component in the second lens group.

With such construction, the second lens group becomes a similar construction of a triplet type, so that aberrations can be excellently corrected.

In the zoom lens system according to the embodiment of the present application, the following conditional expression (2) is preferably satisfied:

$$-0.6 < fF/fR < 0.3 \quad (2)$$

where fF denotes a focal length of the most object side positive lens in the second lens group, and fR denotes a combined focal length of the lenses disposed from the negative lens component to the image plane.

When the ratio fF/fR is equal to or falls below the lower limit of conditional expression (2), positive refractive power of the most object side lens in the second lens group becomes excessively strong, so that it becomes difficult to correct spherical aberration and coma. Otherwise, the total thickness of the second lens group becomes large.

On the other hand, when the ratio fF/fR is equal to or exceeds the upper limit of conditional expression (2), since the combined principal point of the lenses on and after the second lens group shifts toward image side, so that the total lens length becomes large and it becomes difficult to accomplish to be compact.

In order to secure the effect of the present invention, it is preferable to set the lower limit of conditional expression (2) to −0.55. In order to further secure the effect of the present invention, it is more preferable to set the lower limit of conditional expression (2) to −0.40. In order to secure the effect of the present invention, it is preferable to set the upper limit of conditional expression (2) to 0.25. In order to further secure the effect of the present invention, it is more preferable to set the upper limit of conditional expression (2) to 0.0.

In the zoom lens system according to the embodiment of the present application, the following conditional expressions (3) and (4) are preferably satisfied:

$$1.68 < nd \quad (3)$$

$$vd < 40 \quad (4)$$

where nd denotes refractive index of the negative lens in the negative lens component in the second lens group at d-line (wavelength λ=587.6 nm), and vd denotes Abbe number of the negative lens in the negative lens component in the second lens group at d-line (wavelength λ=587.6 nm).

Conditional expression (3) and (4) are conditions regarding the negative lens in the negative lens component in the second lens group. In order to construct second lens group with fewer number of lenses using thinner lenses aiming to be compact, it is necessary to satisfy conditional expressions (3) and (4). When the value nd is equal to or falls below the lower limit of conditional expression (3), Petzval sum cannot be corrected, so that it becomes difficult to correct various aberrations. When the value vd is equal to or exceeds the upper limit of conditional expression (4), it becomes difficult to excellently correct longitudinal chromatic aberration.

In order to secure the effect of the present invention, it is preferable to set the lower limit of conditional expression (3) to 1.70. In order to further secure the effect of the present invention, it is more preferable to set the lower limit of conditional expression (3) to 1.75. In order to secure the effect of the present invention, it is preferable to set the upper limit of conditional expression (4) to 30.

In the zoom lens system according to the embodiment of the present application, it is preferable that at least one aspherical surface is included in both of the first lens group and the second lens group.

When the first lens group is composed of two lenses which are a negative lens and a positive lens, with introducing an aspherical surface into the most object side negative lens, it becomes possible to excellently correct negative distortion generated in the wide-angle end state. In order to excellently correct spherical aberration, it is preferable that an aspherical surface is introduced into the most object side positive lens in the second lens group. Moreover, when both of the surfaces of the positive lens are formed with aspherical surfaces, it becomes possible to simultaneously correct spherical aberration by the object side aspherical surface and coma by the image side aspherical surface, so that aberrations of the zoom lens system can excellently be corrected.

In the zoom lens system according to the embodiment of the present application, it is preferable that focusing from infinity to a close object is carried out by moving the first lens group along the optical axis. Incidentally, focusing may be a unit focusing in which focusing is carried out by moving the whole lens system in a body including the first lens group and the second lens group, or may be carried out by moving an imaging device such as a CCD disposed on the image plane.

In the zoom lens system according to the embodiment of the present application, it is preferable that the negative lens component is a single negative lens. With constructing the negative lens component by a single negative lens, it becomes easy to make the system compact. Moreover, it is preferable that the negative lens component has a meniscus shape with a convex surface facing the object. With taking a meniscus shape with a convex surface facing the object, positive refractive power taken on the second lens group can be shared with the negative lens component in addition to the most object side positive lens, so that spherical aberration can be excellently corrected.

In the zoom lens system according to the embodiment of the present application, it is preferable that the negative lens component included in the second lens group is a cemented lens constructed by, in order from the object, a negative lens cemented with a positive lens. With such construction, it becomes possible to excellently correct chromatic aberration.

Each example of the zoom lens system according to the embodiment of the present application will be explained with reference to accompanying drawings.

EXAMPLE 1

FIG. 1 is a diagram showing a lens configuration of a zoom lens system according to Example 1 of the present application in which W shows a wide-angle end state, M shows an intermediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 1 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a double convex positive lens L21, an aperture stop S for defining an f-number, a double concave negative lens L22, and a double convex positive lens L23.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with the zoom lens system according to Example 1 are listed in Table 1.

In [Specifications], f denotes a focal length, Bf denotes a back focal length, FNO denotes an f-number, and 2ω denotes an angle of view.

In [Lens Data], the left most column shows the lens surface number counted in order from the object side, the second column "r" shows a radius of curvature of the lens surface, the third column "d" shows a distance to the next lens surface, the fourth column "vd" shows Abbe number of a medium at d-line (wavelength λ=587.6 nm), the fifth column "nd" shows refractive index of the medium at d-line (wavelength λ=587.6 nm), r=∞ denotes a plane surface, and refractive index of the air n=1.000 is omitted.

In [Aspherical Data], respective aspherical coefficients expressed by the following expression are shown:

$$X(y)=y^2/[r\times\{1+(1-\kappa\times y^2/r^2)^{1/2}\}]+C4\times y^4+C6\times y^6+C8\times y^8+C10\times y^{10}+C12\times y^{12}$$

where X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), κ denotes a conical coefficient, and Ci denotes aspherical coefficient of i-th order. "E-n (n: integer)" means "$10^{-n}$". The position of an aspherical surface is expressed by attaching "*" to the left side of the surface number in [Lens Data].

In [Variable Distances], W denotes a wide-angle end state, M denotes an intermediate focal length state, T denotes a telephoto end state, f denotes the focal length, β denotes imaging magnification, Bf denotes a back focal length, D0 denotes a distance between the object and the most object side lens surface, and TL denotes a total lens length. In [Values for Conditional Expressions], values for respective conditional expressions are shown.

In the tables for various values, "mm" is generally used for the unit of length such as the focal length, the radius of curvature and the distance to the next lens surface. However, since an optical system proportionally enlarged or reduced its dimension can attain similar optical performance, the unit is not necessary to be limited to "mm", and any other suitable unit can be used.

The explanation of reference symbols is the same in the other Examples, so that duplicated explanations are omitted.

TABLE 1

[Specifications]

|  | W | M | T |
|---|---|---|---|
| f = | 5.95 | 9.0 | 17.2 |
| Bf = | 1.96141 | (constant) |  |
| FNO = | 2.91 | 3.46 | 4.98 |
| 2ω = | 67.9 | 46.2 | 24.7° |

[Lens Data]

|  | r | d | vd | nd |
|---|---|---|---|---|
| 1 | 79.2937 | 1.0287 | 40.88 | 1.806098 |
| *2 | 4.4955 | 1.7775 |  |  |
| 3 | 8.0972 | 1.3000 | 23.78 | 1.846660 |
| 4 | 19.2129 | (D4) |  |  |
| *5 | 4.9081 | 1.8000 | 63.76 | 1.632460 |
| *6 | −65.8043 | 0.5000 |  |  |
| 7 | ∞ | 0.6263 | Aperture Stop S | |
| 8 | −7147.4835 | 0.8000 | 32.35 | 1.850260 |
| 9 | 4.7657 | 0.3000 |  |  |
| 10 | 8.7802 | 1.4000 | 63.38 | 1.618000 |
| 11 | −9.6008 | (D11) |  |  |
| 12 | ∞ | 0.6000 | 64.20 | 1.516800 |
| 13 | ∞ | 0.5000 |  |  |
| 14 | ∞ | 0.5000 | 64.20 | 1.516800 |
| 15 | ∞ | (Bf) |  |  |

[Aspherical Data]

Surface Number 2

κ = 0.4941
C4 = −1.36000E−04
C6 = −2.74980E−06
C8 = −3.55930E−07
C10 = 2.60670E−09
C12 = 0.00000E+00

Surface Number 5

κ = 0.7744
C4 = −3.02500E−04
C6 = −1.61760E−05
C8 = 1.43200E−14
C10 = 1.58670E−16
C12 = 0.00000E+00

TABLE 1-continued

Surface Number 6

κ = −751.1888
C4 = 1.50830E−05
C6 = 1.00000E−12
C8 = 1.00000E−14
C10 = 1.00000E−16
C12 = 0.00000E+00

[Variable Distances]

| | W | M | T |
|---|---|---|---|
| <Focusing on infinity> | | | |
| f = | 5.95 | 9.0 | 17.2 |
| D0 = | ∞ | ∞ | ∞ |
| D4 = | 12.61817 | 6.60987 | 1.02190 |
| D11 = | 7.65980 | 10.31884 | 17.46775 |
| TL = | 33.27196 | 29.92270 | 31.48364 |
| <Focusing on a close object> | | | |
| β = | −0.05374 | −0.04271 | −0.03368 |
| D0 = | 100.0000 | 200.0000 | 500.0000 |
| D4 = | 13.71102 | 7.18409 | 1.25882 |
| D11 = | 7.65980 | 10.31884 | 17.46775 |
| TL = | 34.36479 | 30.49691 | 31.72055 |

[Values for Conditional Expressions]

(1): Da/fw = 0.18929
(2): fF/fR = −0.224
(3): nd = 1.85026
(4): vd = 32.35

Figure 2A:
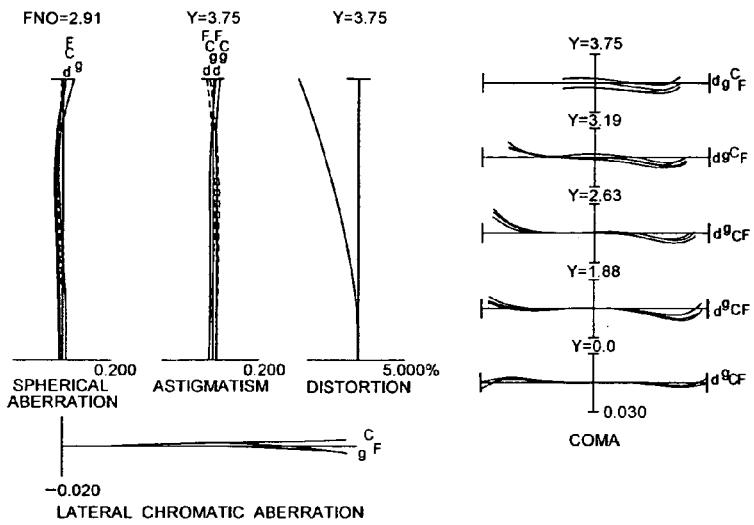
Figure 2B:
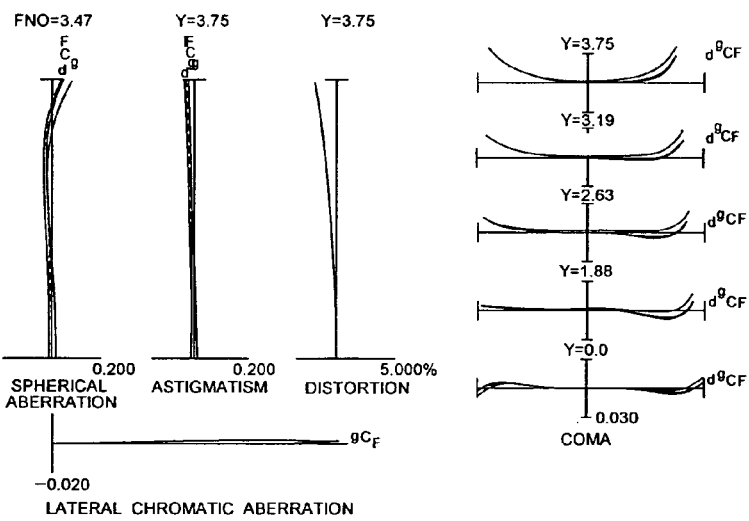
Figure 2C:
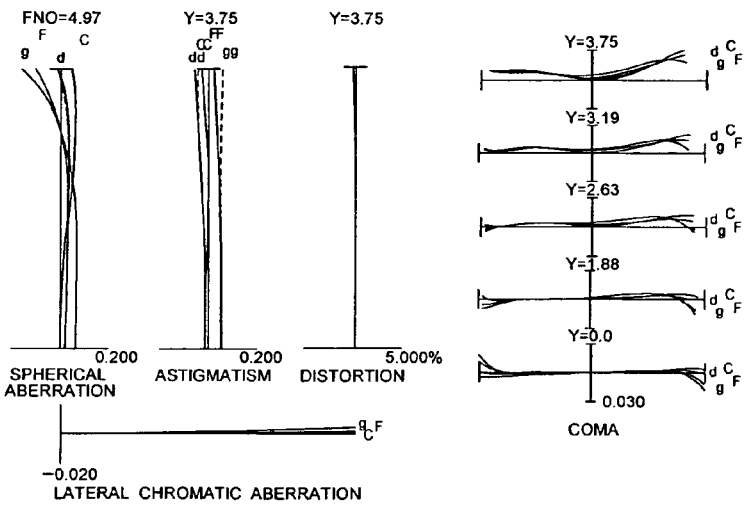
Figure 3A:
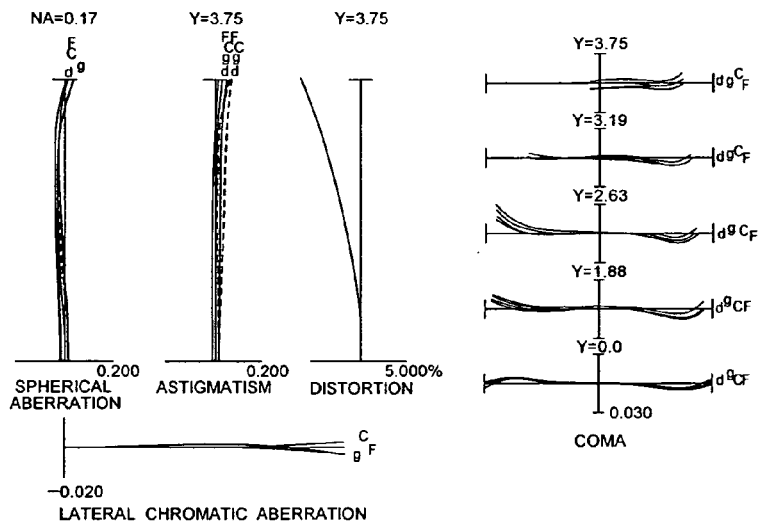
Figure 3B:
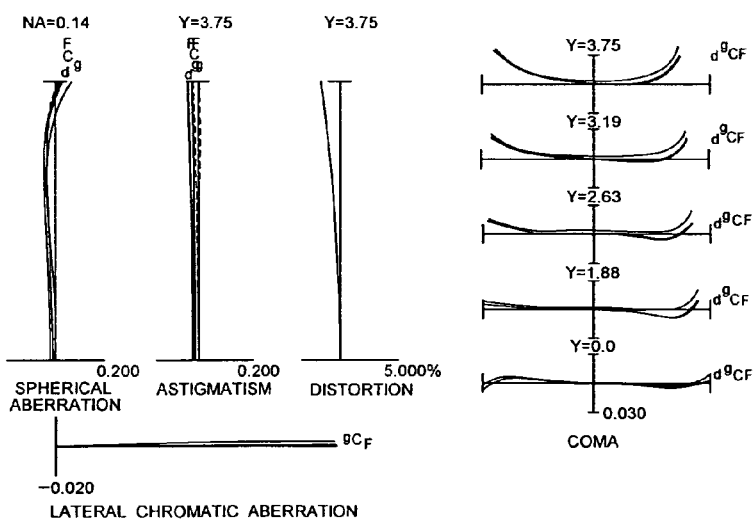
Figure 3C:
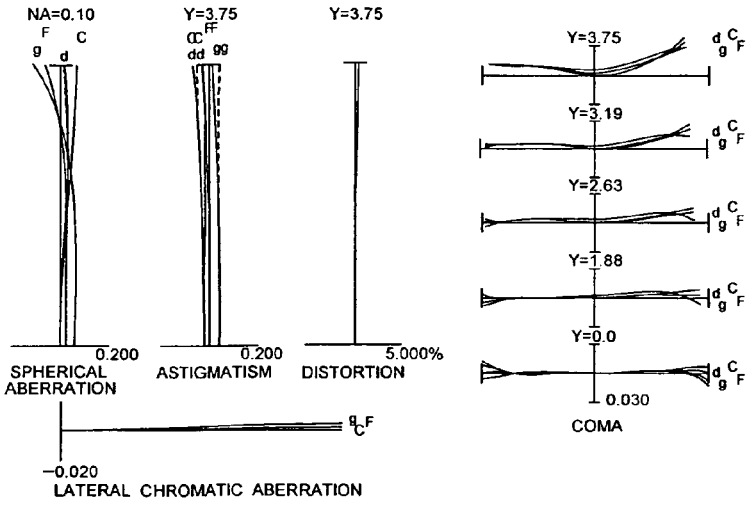

FIGS. 2A, 2B, and 2C are graphs showing various aberrations of the zoom lens system according to Example 1 focusing on infinity in which FIG. 2A shows various aberrations in the wide-angle end state, FIG. 2B shows various aberrations in the intermediate focal length state, and FIG. 2C shows various aberrations in the telephoto end state. FIGS. 3A, 3B, and 3C are graphs showing various aberrations of the zoom lens system according to Example 1 focusing on a close object in which FIG. 3A shows various aberrations in the wide-angle end state, FIG. 3B shows various aberrations in the intermediate focal length state, and FIG. 3C shows various aberrations in the telephoto end state.

In respective graphs, FNO denotes an f-number, NA denotes a numerical aperture, and Y denotes an image height. C denotes aberration curve at C-line (wavelength λ=656.3 nm), d denotes aberration curve at d-line (wavelength λ=587.6 nm), F denotes aberration curve at F-line (wavelength λ=486.1 nm), and g denotes aberration curve at g-line (wavelength λ=435.8 nm). In the graphs showing spherical aberration, the f-number with respect to the maximum aperture or the maximum value of NA is shown. In graphs showing astigmatism and distortion, the maximum value of the image height Y is shown. In graphs showing coma, coma with respect to each image height Y is shown. In the graph showing spherical aberration, a solid line indicates spherical aberration and a broken line indicates sine condition. In the graph showing astigmatism, a solid line indicates a sagittal image plane, and a broken line indicates a meridional image plane. The above-described explanation regarding various aberration graphs is the same as the other examples.

As is apparent from the respective graphs, the zoom lens system according to Example 1 shows superb optical performance as a result of good corrections to various aberrations over entire focal length range from the wide-angle end state to the telephoto end state.

EXAMPLE 2

FIG. 4 is a diagram showing a lens configuration of a zoom lens system according to Example 2 of the present application in which W shows a wide-angle end state, M shows an intermediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 2 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a positive meniscus lens L21 having a convex surface facing the object, an aperture stop S for defining an f-number, and a cemented lens constructed by a double concave negative lens L22 cemented with a double convex positive lens L23.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with a zoom lens system according to Example 2 is listed in Table 2.

TABLE 2

[Specifications]

| | W | M | T |
|---|---|---|---|
| f = | 6.2 | 10 | 17.5 |
| Bf = | 0.9121 | (constant) | |
| FNO = | 3.0 | 3.7 | 5.3 |
| 2ω = | 66.1 | 41.9 | 24.3° |

[Lens Data]

| | r | d | vd | nd |
|---|---|---|---|---|
| 1 | 141.0413 | 1.2000 | 40.73 | 1.806100 |
| *2 | 4.8494 | 2.1000 | | |
| 3 | 9.0059 | 1.6000 | 22.76 | 1.808095 |
| 4 | 21.2511 | (D4) | | |
| *5 | 5.2425 | 1.8814 | 53.21 | 1.693501 |
| 6 | 95.8418 | 0.3165 | | |
| 7 | ∞ | 0.5165 | Aperture Stop S | |
| 8 | −13.5131 | 0.8000 | 34.71 | 1.720467 |
| 9 | 4.5000 | 2.2000 | 61.14 | 1.589130 |
| *10 | −11.9515 | (D10) | | |
| 11 | ∞ | 0.5000 | 64.14 | 1.516330 |
| 12 | ∞ | 0.4000 | | |
| 13 | ∞ | 0.5000 | 64.14 | 1.516330 |
| 14 | ∞ | (Bf) | | |

TABLE 2-continued

[Aspherical Data]

Surface Number 2

$\kappa$ = 0.1322
C4 = 2.09720E−04
C6 = 1.57840E−05
C8 = −1.45320E−06
C10 = 5.63210E−08
C12 = −0.50215E−09

Surface Number 5

$\kappa$ = 0.4258
C4 = 4.66440E−04
C6 = 2.06560E−05
C8 = 1.66800E−06
C10 = 9.46820E−10
C12 = 0.00000E+00

Surface Number 10

$\kappa$ = −7.6137
C4 = 9.03720E−04
C6 = 6.52660E−05
C8 = 9.09600E−06
C10 = 0.00000E+00
C12 = 0.00000E+00

[Variable Distances]

| | W | M | T |
|---|---|---|---|
| <Focusing on infinity> | | | |
| f = | 6.20 | 10.0 | 17.5 |
| D0 = | ∞ | ∞ | ∞ |
| D4 = | 13.61053 | 6.69822 | 1.86479 |
| D10 = | 10.42386 | 14.08066 | 21.29803 |
| TL = | 36.96080 | 33.70529 | 36.08925 |
| <Focusing on a close object> | | | |
| β = | −0.05603 | −0.04747 | −0.03427 |
| D0 = | 100.0000 | 200.0000 | 500.0000 |
| D4 = | 14.66968 | 7.25457 | 2.09430 |
| D10 = | 10.42386 | 14.08066 | 21.29803 |
| TL = | 38.01995 | 34.26164 | 36.31874 |

[Values for Conditional Expressions]

(1): Da/fw = 0.051048
(2): fF/fR = −0.214
(3): nd = 1.720467
(4): νd = 34.71

Figure 5A:
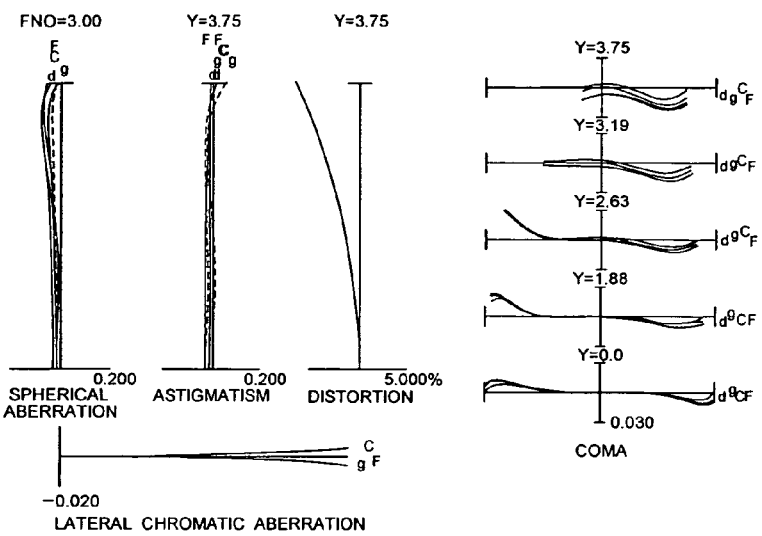
Figure 5B:
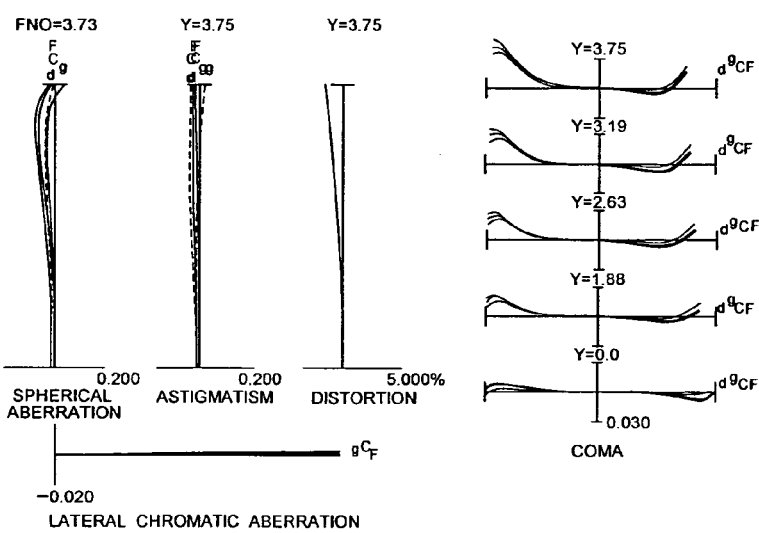
Figure 5C:
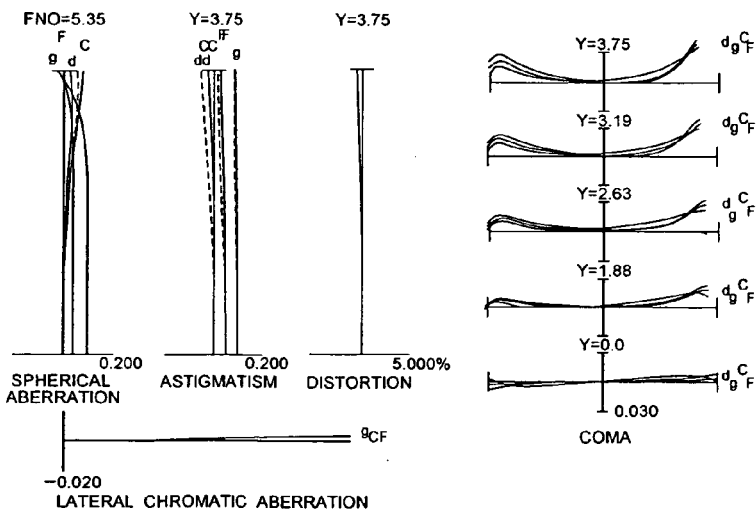

FIGS. 5A, 5B, and 5C are graphs showing various aberrations of the zoom lens system according to Example 2 focusing on infinity in which FIG. 5A shows various aberrations in the wide-angle end state, FIG. 5B shows various aberrations in the intermediate focal length state, and FIG. 5C shows various aberrations in the telephoto end state. FIGS. 6A, 6B, and 6C are graphs showing various aberrations of the zoom lens system according to Example 2 focusing on a close object in which FIG. 6A shows various aberrations in the wide-angle end state, FIG. 6B shows various aberrations in the intermediate focal length state, and FIG. 6C shows various aberrations in the telephoto end state.

As is apparent from the respective graphs, the zoom lens system according to Example 2 shows superb optical performance as a result of good corrections to various aberrations over entire focal length range from the wide-angle end state to the telephoto end state.

EXAMPLE 3

Figure 7:
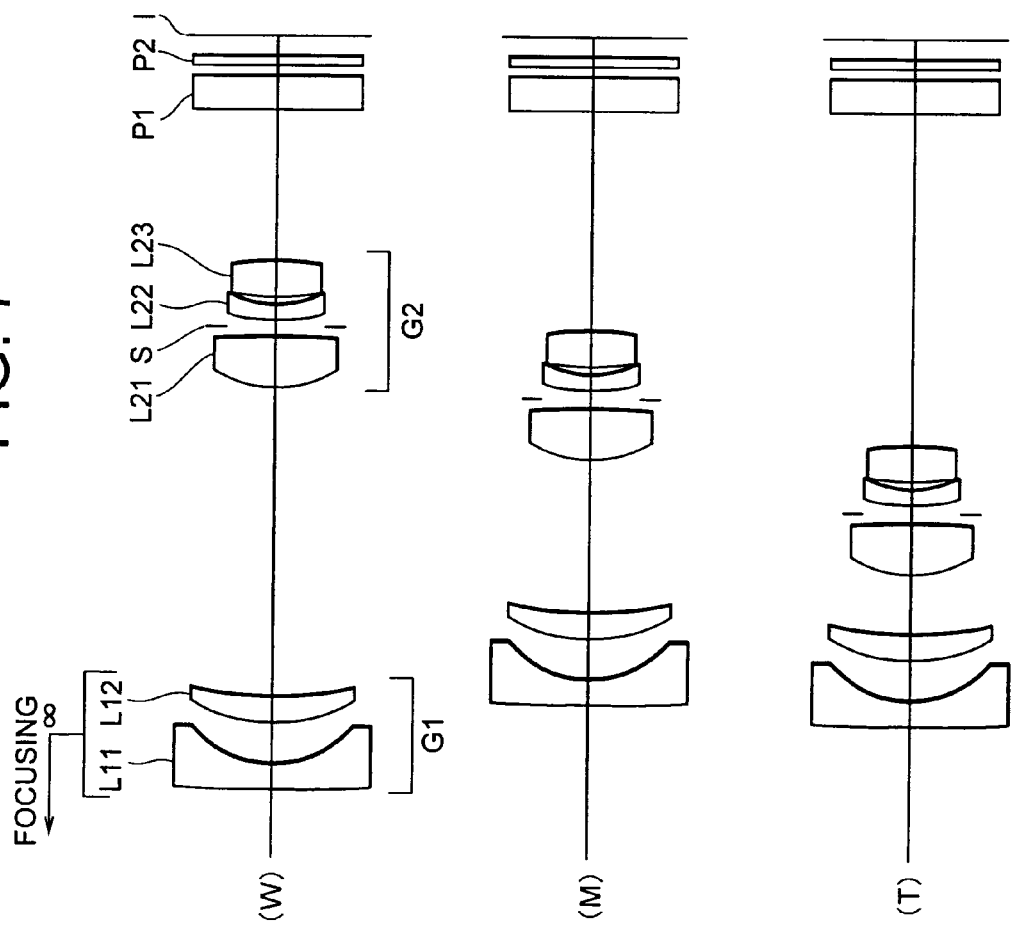
FIG. 7 is a diagram showing a lens configuration of a zoom lens system according to Example 3 of the present application in which W shows a wide-angle end state, M shows an inter mediate focal length state, and T shows a telephoto end state.

FIG. 7 is a diagram showing a lens configuration of a zoom lens system according to Example 3 of the present application in which W shows a wide-angle end state, M shows an inter mediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 3 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a double convex positive lens L21, an aperture stop S for defining an f-number, a negative meniscus lens L22 having a convex surface facing the object, and a double convex positive lens L23.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with a zoom lens system according to Example 3 is listed in Table 3.

TABLE 3

[Specifications]

| | W | M | T |
|---|---|---|---|
| f = | 5.07 | 8.5 | 14.3 |
| Bf = | 1.0 | (constant) | |
| FNO = | 3.05 | 3.8 | 5.06 |
| 2ω = | 64.9 | 39.7 | 23.8° |

[Lens Data]

| | r | d | νd | nd |
|---|---|---|---|---|
| 1 | 86.1156 | 1.3000 | 40.88 | 1.806100 |
| *2 | 4.3116 | 2.0000 | | |
| 3 | 8.0822 | 1.4000 | 22.76 | 1.808095 |
| 4 | 18.7618 | (D4) | | |
| *5 | 5.2613 | 2.6000 | 61.18 | 1.589130 |
| 6 | −180.3166 | 0.4000 | | |
| 7 | 0.0000 | 0.4000 | Aperture Stop S | |
| 8 | 12.6651 | 0.8000 | 23.78 | 1.846660 |
| 9 | 4.5143 | 0.3000 | | |
| 10 | 8.0269 | 1.9000 | 47.22 | 1.540720 |
| 11 | −16.4446 | (D11) | | |
| 12 | ∞ | 1.7030 | 70.51 | 1.544370 |
| 13 | ∞ | 0.5000 | | |
| 14 | ∞ | 0.5000 | 64.14 | 1.516330 |
| 15 | ∞ | (Bf) | | |

TABLE 3-continued

[Aspherical Data]

Surface Number 2

κ = −0.7574
C4 = 1.82110E−03
C6 = −3.25230E−05
C8 = 1.45010E−06
C10 = −3.25940E−08
C12 = 0.00000E+00

Surface Number 5

κ = −0.6195
C4 = 7.52990E−04
C6 = −3.88560E−06
C8 = −1.68010E−08
C10 = 1.00000E−16
C12 = 0.00000E+00

[Variable Distances]

| | W | M | T |
|---|---|---|---|
| <Focusing on infinity> | | | |
| f = | 5.07 | 8.5 | 14.33 |
| D0 = | ∞ | ∞ | ∞ |
| D4 = | 15.37190 | 7.60094 | 2.93235 |
| D11 = | 7.44162 | 10.86533 | 16.68123 |
| TL = | 37.61652 | 33.26926 | 34.41658 |
| <Focusing on a close object> | | | |
| β = | −0.04615 | −0.04051 | −0.02811 |
| D0 = | 100.0000 | 200.0000 | 500.0000 |
| D4 = | 16.26229 | 8.06696 | 3.12414 |
| D11 = | 7.44162 | 10.86533 | 16.68123 |
| TL = | 38.50691 | 33.73528 | 34.60836 |

[Values for Conditional Expressions]

(1): Da/fw = 0.078927
(2): fF/fR = −0.109
(3): nd = 1.846660
(4): νd = 23.78

Figure 8A:
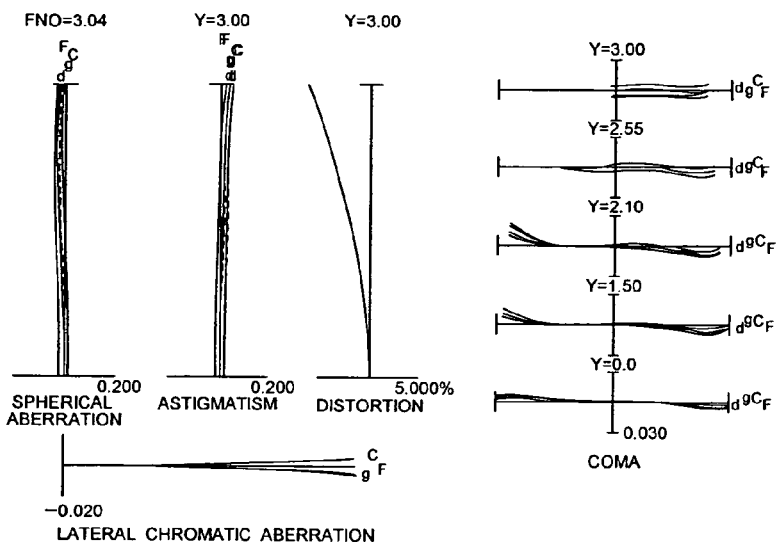
Figure 8B:
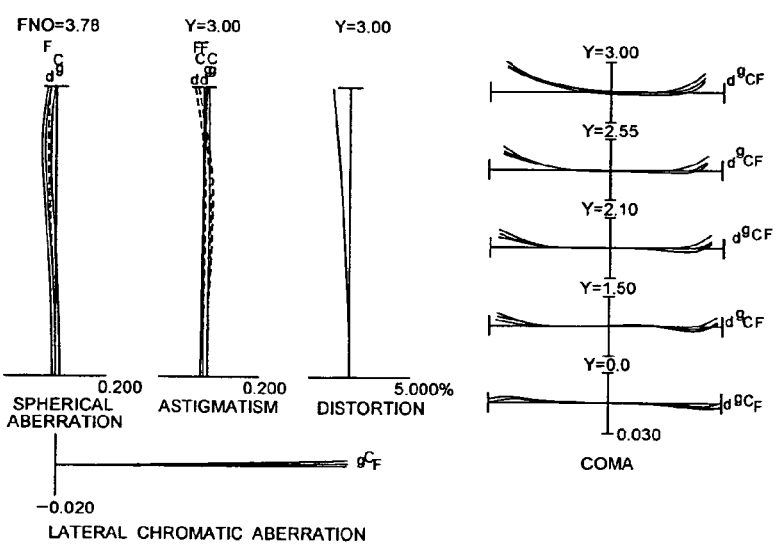
Figure 8C:
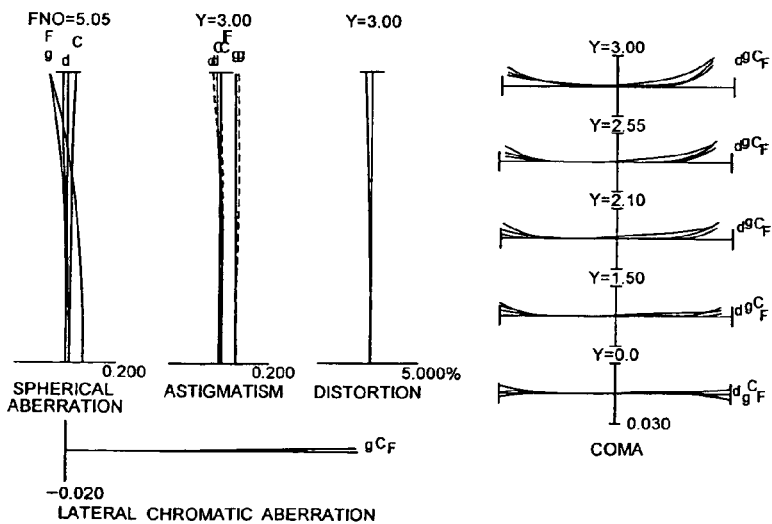
Figure 9A:
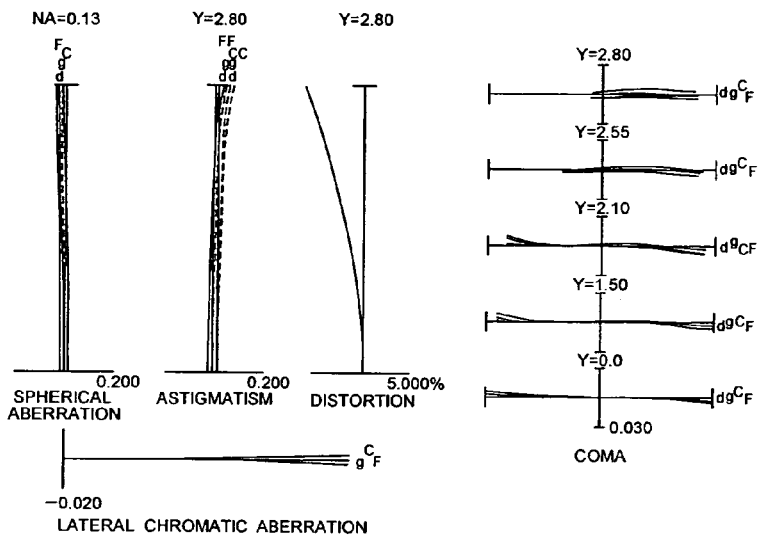
Figure 9B:
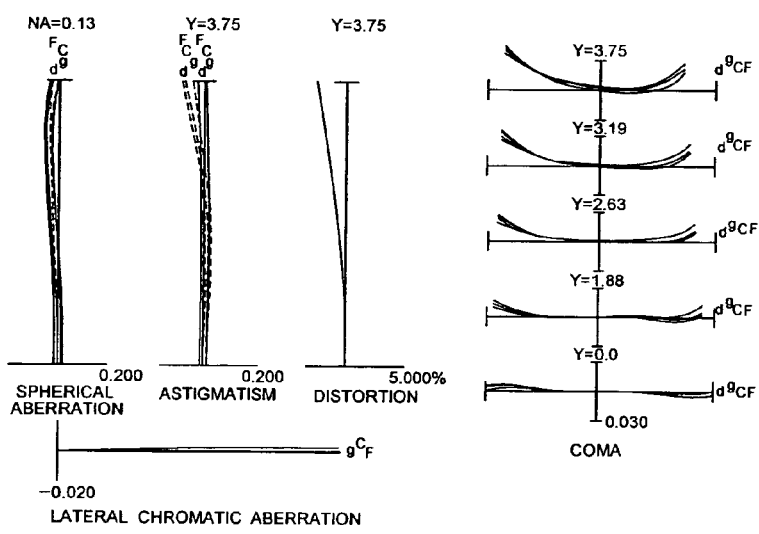
Figure 9C:
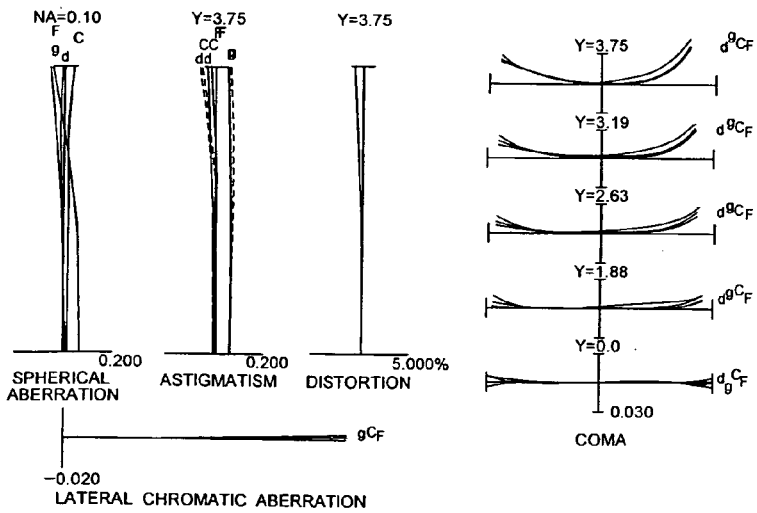

FIGS. 8A, 8B, and 8C are graphs showing various aberrations of the zoom lens system according to Example 3 focusing on infinity in which FIG. 8A shows various aberrations in the wide-angle end state, FIG. 8B shows various aberrations in the intermediate focal length state, and FIG. 8C shows various aberrations in the telephoto end state. FIGS. 9A, 9B, and 9C are graphs showing various aberrations of the zoom lens system according to Example 3 focusing on a close object in which FIG. 9A shows various aberrations in the wide-angle end state, FIG. 9B shows various aberrations in the intermediate focal length state, and FIG. 9C shows various aberrations in the telephoto end state.

As is apparent from the respective graphs, the zoom lens system according to Example 3 shows superb optical performance as a result of good corrections to various aberrations over entire focal length range from the wide-angle end state to the telephoto end state.

EXAMPLE 4

FIG. 10 is a diagram showing a lens configuration of a zoom lens system according to Example 4 of the present application in which W shows a wide-angle end state, M shows an inter mediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 4 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a positive meniscus lens L21 having a concave surface facing the image plane I side, an aperture stop S for defining an f-number, a negative meniscus lens L22 having a convex surface facing the object, and a double convex positive lens L23.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with a zoom lens system according to Example 4 is listed in Table 4.

TABLE 4

[Specifications]

| | W | M | T |
|---|---|---|---|
| f = | 6.1 | 10.0 | 17.6 |
| Bf = | 0.58 | (constant) | |
| FNO = | 3.1 | 3.8 | 5.4 |
| 2ω = | 67.0 | 42.0 | 24.2° |

[Lens Data]

| | r | d | νd | nd |
|---|---|---|---|---|
| 1 | 61.6313 | 1.2000 | 40.94 | 1.806100 |
| *2 | 5.0001 | 1.9000 | | |
| 3 | 8.3947 | 1.5000 | 23.78 | 1.846660 |
| 4 | 17.1826 | (D4) | | |
| *5 | 5.1416 | 2.0000 | 58.19 | 1.622630 |
| 6 | 17.6848 | 1.2000 | | |
| 7 | ∞ | 0.0000 | Aperture Stop S | |
| 8 | 8.6156 | 0.8000 | 22.76 | 1.808090 |
| 9 | 4.3219 | 0.5000 | | |
| 10 | 8.0799 | 1.4000 | 63.38 | 1.618000 |
| 11 | −24.2809 | (D11) | | |
| 12 | ∞ | 0.6000 | 64.14 | 1.516330 |
| 13 | ∞ | 0.4000 | | |
| 14 | ∞ | 0.5000 | 64.14 | 1.516330 |
| 15 | ∞ | (Bf) | | |

[Aspherical Data]

Surface Number 2

κ = 0.7557
C4 = 0.00000E+00
C6 = −1.90590E−04
C8 = −1.94340E−05
C10 = 4.45940E−07
C12 = −2.29100E−08

Surface Number 5

κ = 0.4616
C4 = 0.00000E+00
C6 = 1.00000E−10
C8 = 4.08870E−07

TABLE 4-continued

C10 = 1.00000E−14
C12 = 1.00000E−16

[Variable Distances]

| | W | M | T |
|---|---|---|---|
| <Focusing on infinity> | | | |
| f = | 6.10 | 10.0 | 17.6 |
| D0 = | ∞ | ∞ | ∞ |
| D4 = | 13.92099 | 6.12099 | 0.85281 |
| D11 = | 9.08499 | 12.28172 | 18.51122 |
| TL = | 35.58376 | 30.98048 | 31.94181 |
| <Focusing on a close object> | | | |
| β = | −0.01954 | −0.03203 | −0.05638 |
| D0 = | 300.0000 | 300.0000 | 300.0000 |
| D4 = | 14.39778 | 6.59778 | 1.32960 |
| D11 = | 9.08499 | 12.28172 | 18.51122 |
| TL = | 36.06055 | 31.45727 | 32.41860 |

[Values for Conditional Expressions]

(1): Da/fw = 0.196723
(2): fF/fR = 0.185
(3): nd = 1.808090
(4): νd = 22.76

Figure 11A:
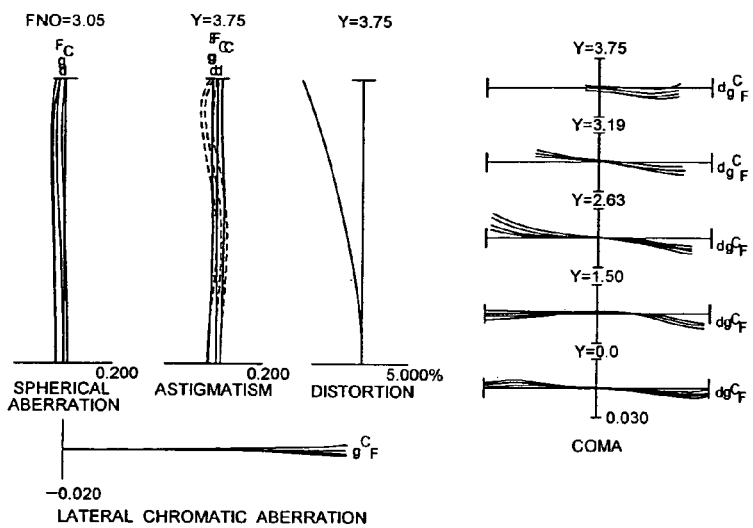
Figure 11B:
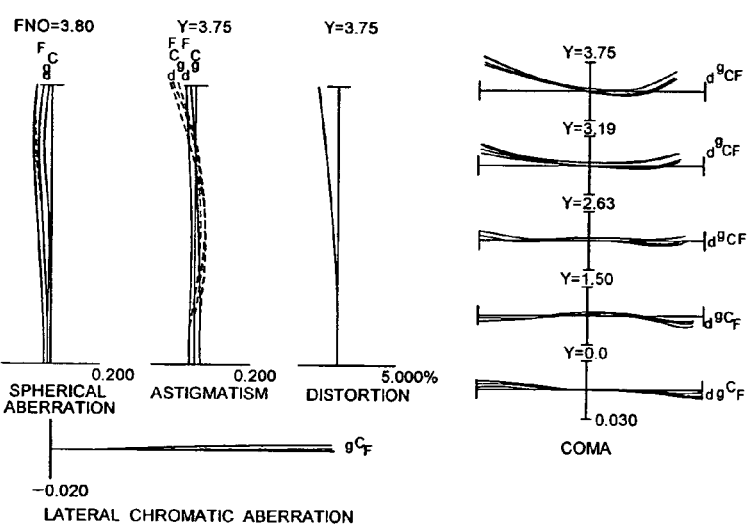
Figure 11C:
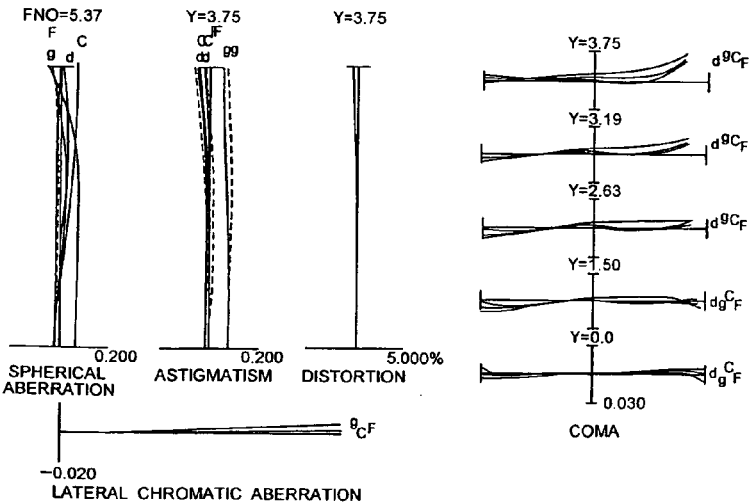
Figure 12A:
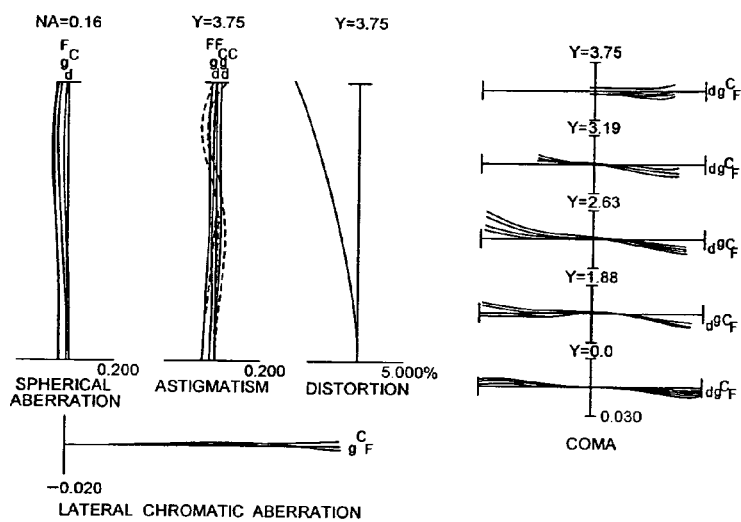
Figure 12B:
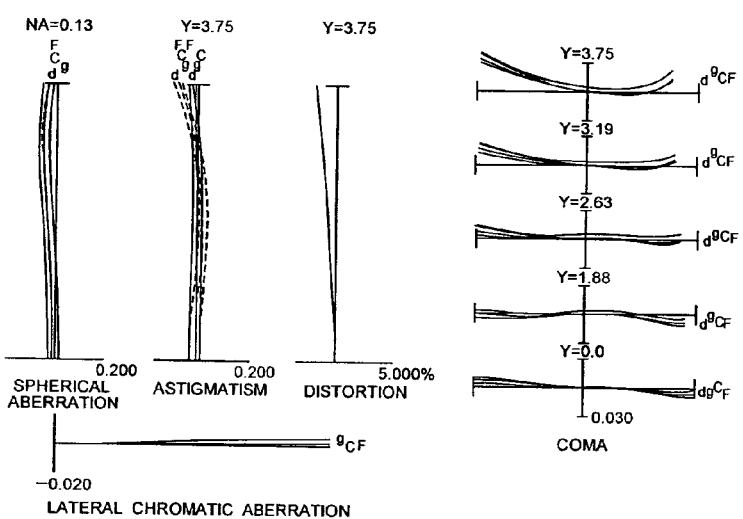
Figure 12C:
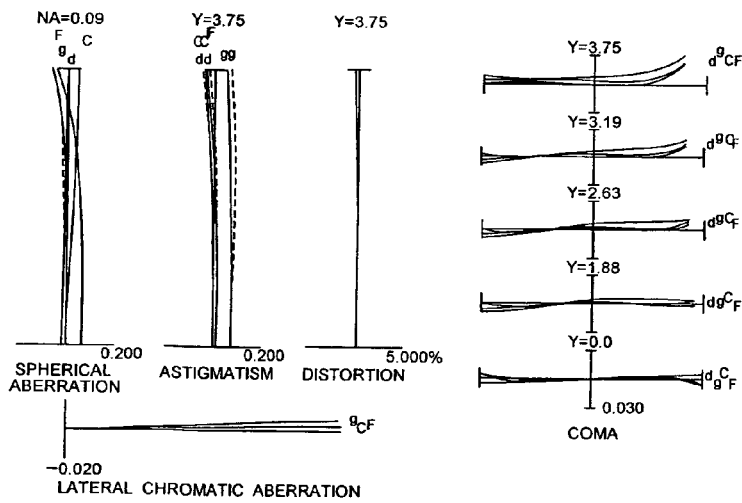

FIGS. 11A, 11B, and 11C are graphs showing various aberrations of the zoom lens system according to Example 4 focusing on infinity in which FIG. 11A shows various aberrations in the wide-angle end state, FIG. 11B shows various aberrations in the intermediate focal length state, and FIG. 11C shows various aberrations in the telephoto end state. FIGS. 12A, 12B, and 12C are graphs showing various aberrations of the zoom lens system according to Example 4 focusing on a close object in which FIG. 12A shows various aberrations in the wide-angle end state, FIG. 12B shows various aberrations in the intermediate focal length state, and FIG. 12C shows various aberrations in the telephoto end state.

As is apparent from the respective graphs, the zoom lens system according to Example 4 shows superb optical performance as a result of good corrections to various aberrations over entire focal length range from the wide-angle end state to the telephoto end state.

EXAMPLE 5

FIG. 13 is a diagram showing a lens configuration of a zoom lens system according to Example 5 of the present application in which W shows a wide-angle end state, M shows an inter mediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 5 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a double convex positive lens L21, an aperture stop S for defining an f-number, a negative meniscus lens L22 having a convex surface facing the object, and a positive meniscus lens L23 having a concave surface facing the object.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with a zoom lens system according to Example 5 is listed in Table 5.

TABLE 5

[Specifications]

| | W | M | T |
|---|---|---|---|
| f = | 5.95 | 10 | 17 |
| Bf = | 0.545 | (constant) | |
| FNO = | 2.9 | 3.7 | 5.1 |
| 2ω = | 68.2 | 41.9 | 25.0° |

[Lens Data]

| | r | d | νd | nd |
|---|---|---|---|---|
| 1 | 169.5207 | 1.0000 | 40.94 | 1.806100 |
| *2 | 4.3036 | 1.6000 | | |
| 3 | 7.9259 | 1.6000 | 22.76 | 1.808090 |
| 4 | 24.6773 | (D4) | | |
| *5 | 4.0670 | 2.0000 | 53.22 | 1.693500 |
| *6 | −15.8434 | −0.1000 | | |
| 7 | ∞ | 0.2000 | Aperture Stop S | |
| 8 | 24.7895 | 0.8000 | 28.27 | 2.003300 |
| 9 | 3.8309 | 0.7000 | | |
| 10 | −68.6946 | 1.2000 | 59.10 | 1.583320 |
| *11 | −6.1314 | (D11) | | |
| 12 | ∞ | 0.7600 | 64.20 | 1.516800 |
| 13 | ∞ | 0.5000 | | |
| 14 | ∞ | 0.5000 | 64.20 | 1.516800 |
| 15 | ∞ | (Bf) | | |

[Aspherical Data]

Surface Number 2

κ = 0.8158
C4 = −6.54920E−04
C6 = −4.99880E−05
C8 = 1.74790E−06
C10 = −1.39860E−07
C12 = 0.00000E+00

Surface Number 5

κ = 0.3831
C4 = 1.88110E−04
C6 = 2.90520E−05
C8 = 0.00000E+00
C10 = 0.00000E+00
C12 = 0.00000E+00

Surface Number 6

κ = 1.0000
C4 = 2.60760E−03
C6 = −7.46670E−05
C8 = 9.42350E−07
C10 = 0.00000E+00
C12 = 0.00000E+00

Surface Number 11

κ = 3.3820
C4 = −1.66920E−04
C6 = 7.17250E−05

TABLE 5-continued

C8 = 0.00000E+00
C10 = 0.00000E+00
C12 = 0.00000E+00

[Variable Distances]

| | W | M | T |
|---|---|---|---|
| <Focusing on infinity> | | | |
| f = | 5.95 | 10.0 | 17.0 |
| D0 = | ∞ | ∞ | ∞ |
| D4 = | 11.22762 | 4.66186 | 0.68998 |
| D11 = | 8.72004 | 12.19693 | 18.20636 |
| TL = | 31.25273 | 28.16385 | 30.20140 |
| <Focusing on a close object> | | | |
| β = | −0.05396 | −0.04756 | −0.03332 |
| D0 = | 100.0000 | 200.0000 | 500.0000 |
| D4 = | 12.24663 | 5.19624 | 0.91018 |
| D11 = | 8.72004 | 12.19693 | 18.20636 |
| TL = | 32.27174 | 28.69823 | 30.42160 |

[Values for Conditional Expressions]

(1): Da/fw = −0.01681
(2): fF/fR = −0.498
(3): nd = 2.003300
(4): νd = 28.27

Figure 14A:
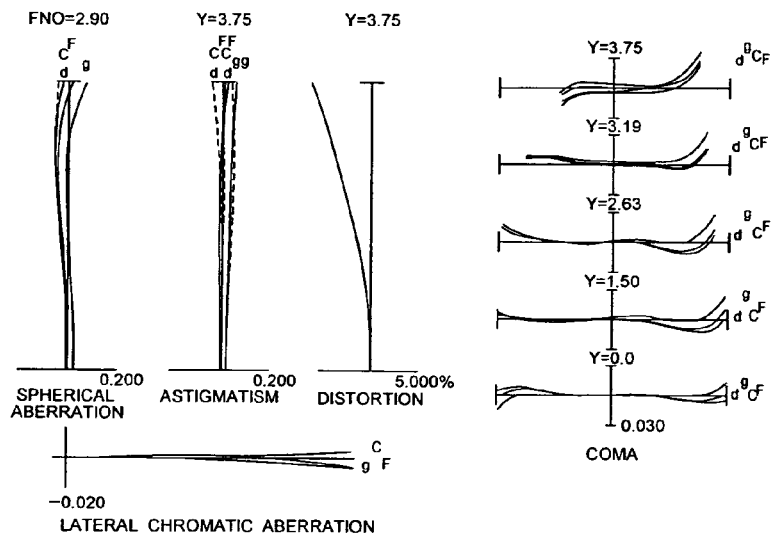
Figure 14B:
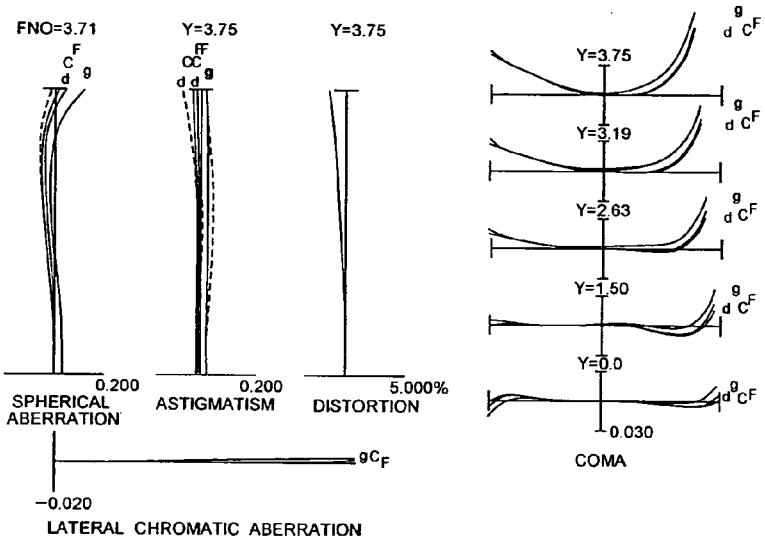
Figure 14C:
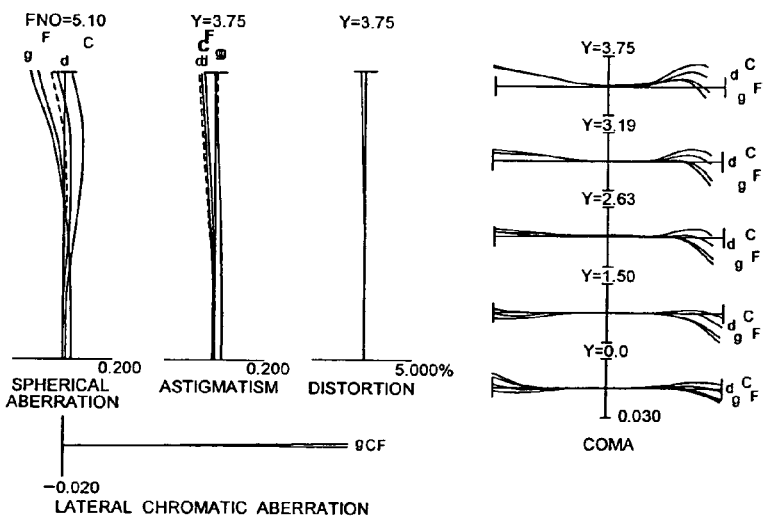
Figure 15A:
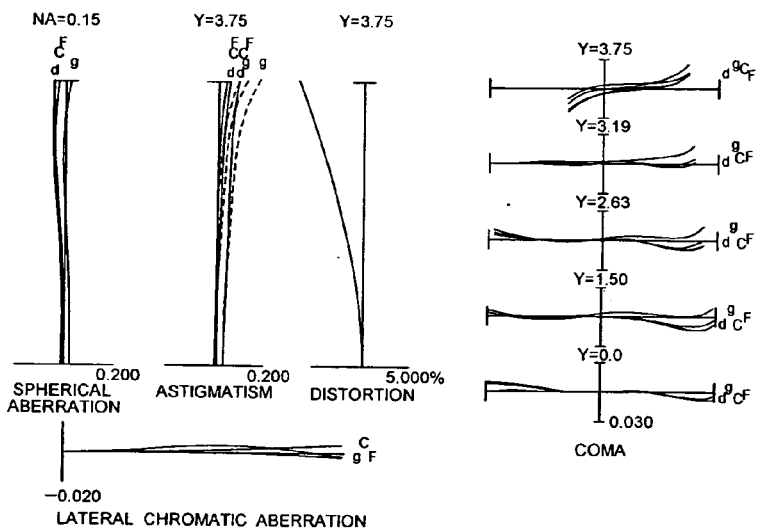
Figure 15B:
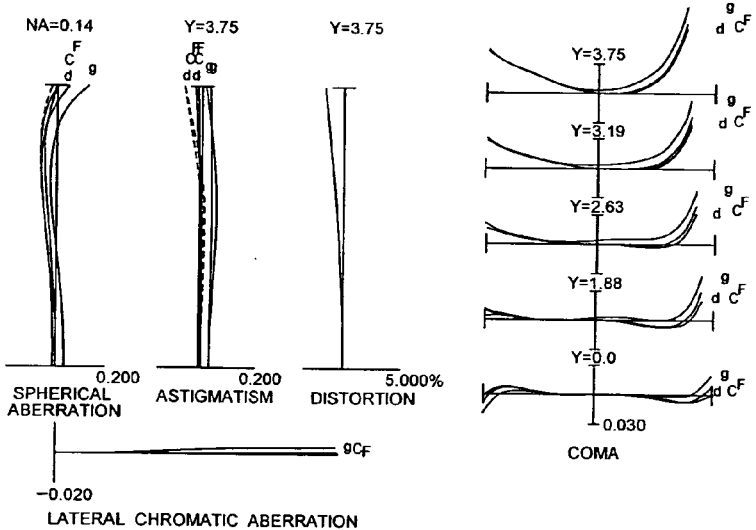
Figure 15C:
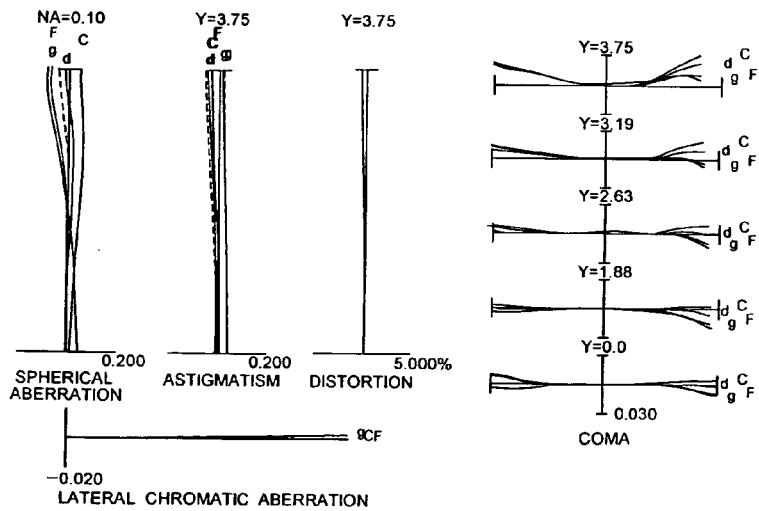

FIGS. 14A, 14B, and 14C are graphs showing various aberrations of the zoom lens system according to Example 5 focusing on infinity in which FIG. 14A shows various aberrations in the wide-angle end state, FIG. 14B shows various aberrations in the intermediate focal length state, and FIG. 14C shows various aberrations in the telephoto end state. FIGS. 15A, 15B, and 15C are graphs showing various aberrations of the zoom lens system according to Example 5 focusing on a close object in which FIG. 15A shows various aberrations in the wide-angle end state, FIG. 15B shows various aberrations in the intermediate focal length state, and FIG. 15C shows various aberrations in the telephoto end state.

As is apparent from the respective graphs, the zoom lens system according to Example 5 shows superb optical performance as a result of good corrections to various aberrations over entire focal length range from the wide-angle end state to the telephoto end state.

EXAMPLE 6

FIG. 16 is a diagram showing a lens configuration of a zoom lens system according to Example 6 of the present application in which W shows a wide-angle end state, M shows an inter mediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 6 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a double convex positive lens L21, an aperture stop S for defining an f-number, a double concave negative lens L22, and a double convex positive lens L23.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with a zoom lens system according to Example 6 is listed in Table 6.

TABLE 6

[Specifications]

| | W | M | T |
|---|---|---|---|
| f = | 5.9 | 10 | 16.5 |
| Bf = | 1.445 | (constant) | |
| FNO = | 3.11 | 3.73 | 5.24 |
| 2ω = | 61.4 | 40.6 | 22.4° |

[Lens Data]

| | r | d | νd | nd |
|---|---|---|---|---|
| 1 | 42.8029 | 1.0000 | 40.88 | 1.806098 |
| *2 | 5.0097 | 1.8800 | | |
| 3 | 8.0164 | 1.4000 | 23.06 | 1.860740 |
| 4 | 15.4013 | (D4) | | |
| 5 | 4.3358 | 1.9306 | 49.32 | 1.743300 |
| *6 | −258.1167 | 0.2000 | | |
| 7 | ∞ | 0.2000 | Aperture Stop S | |
| 8 | −36.4091 | 0.8000 | 23.78 | 1.846660 |
| 9 | 7.0339 | 0.5970 | | |
| 10 | 35.3638 | 1.1000 | 55.39 | 1.669100 |
| *11 | −15.6548 | (D11) | | |
| 12 | ∞ | 0.6000 | 64.20 | 1.516800 |
| 13 | ∞ | 0.4000 | | |
| 14 | ∞ | 0.5000 | 64.20 | 1.516800 |
| 15 | ∞ | (Bf) | | |

[Aspherical Data]

Surface Number 2

κ = 0.2464
C4 = 0.00000E+00
C6 = 3.05360E−04
C8 = 4.00680E−06
C10 = −4.23130E−08
C12 = 2.18920E−09

Surface Number 6

κ = 9275.1900
C4 = 0.00000E+00
C6 = 6.90710E−04
C8 = −5.41700E−05
C10 = −5.06420E−06
C12 = 5.83430E−07

Surface Number 11

κ = −24.3457
C4 = 0.00000E+00
C6 = 1.45080E−03
C8 = 3.05990E−04
C10 = −9.36740E−07
C12 = 4.95580E−06

TABLE 6-continued

[Variable Distances]

| | W | M | T |
|---|---|---|---|
| <Focusing on infinity> | | | |
| f = | 5.90 | 10.0 | 16.5 |
| D0 = | ∞ | ∞ | ∞ |
| D4 = | 13.47999 | 5.12092 | 0.38227 |
| D11 = | 6.93446 | 9.79087 | 14.31934 |
| TL = | 32.46664 | 26.96399 | 26.75379 |
| <Focusing on a close object> | | | |
| β = | −0.03620 | −0.06135 | −0.10123 |
| D0 = | 150.0000 | 150.0000 | 150.0000 |
| D4 = | 14.53925 | 6.18019 | 1.44153 |
| D11 = | 6.93446 | 9.79087 | 14.31934 |
| TL = | 33.52590 | 28.02325 | 27.81306 |

[Values for Conditional Expressions]

(1): Da/fw = 0.033898
(2): fF/fR = −0.424
(3): nd = 1.846660
(4): νd = 23.78

Figure 17A:
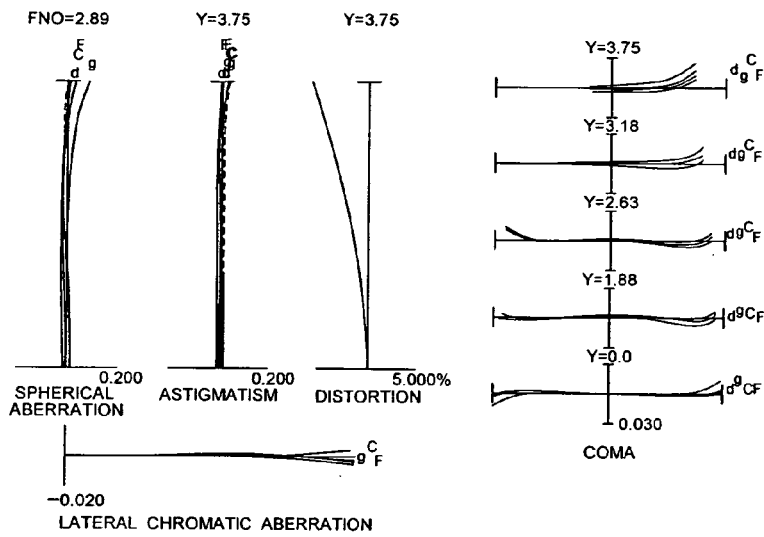
Figure 17B:
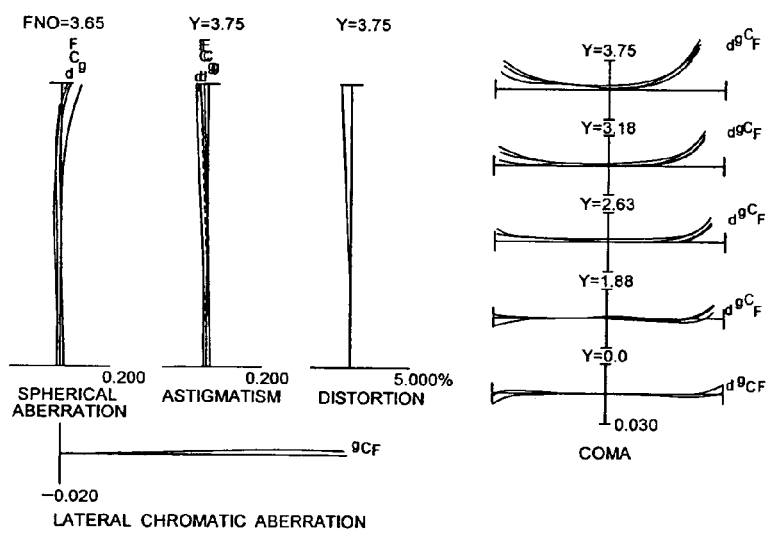
Figure 17C:
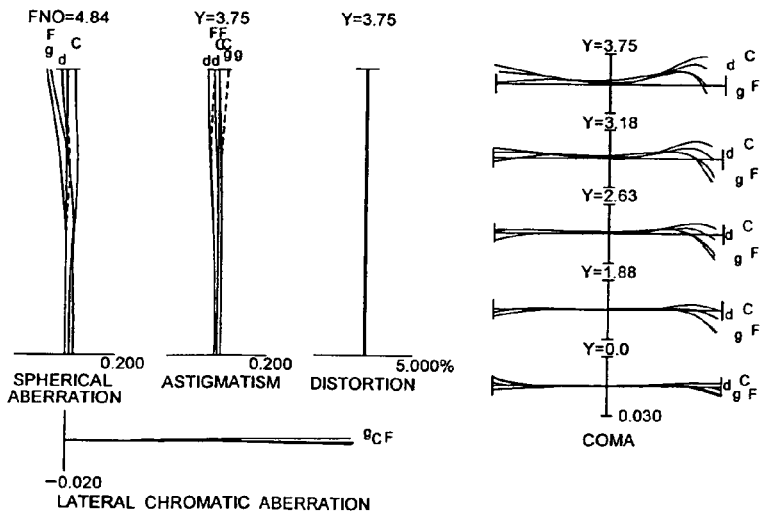
Figure 18A:
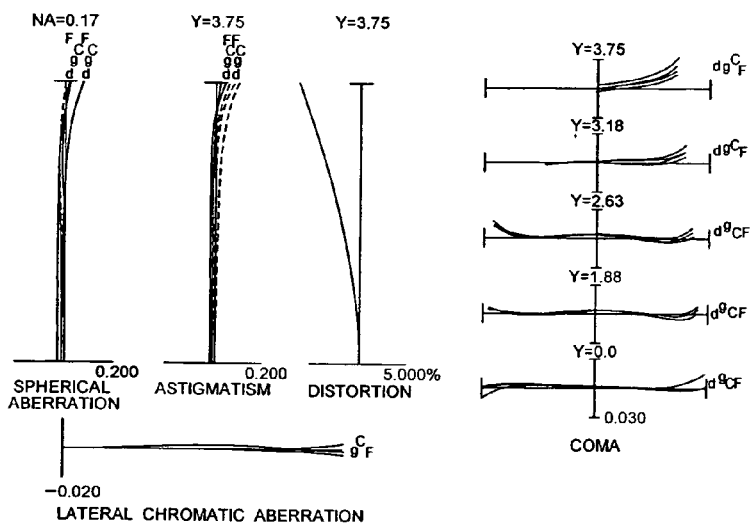
Figure 18B:
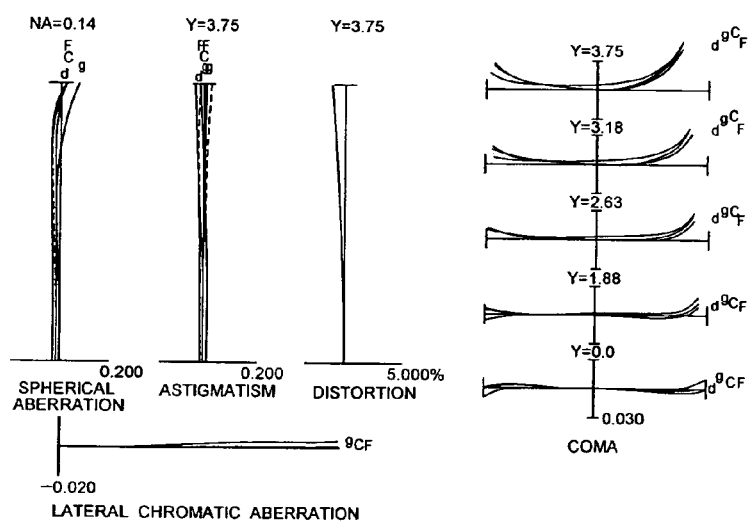
Figure 18C:
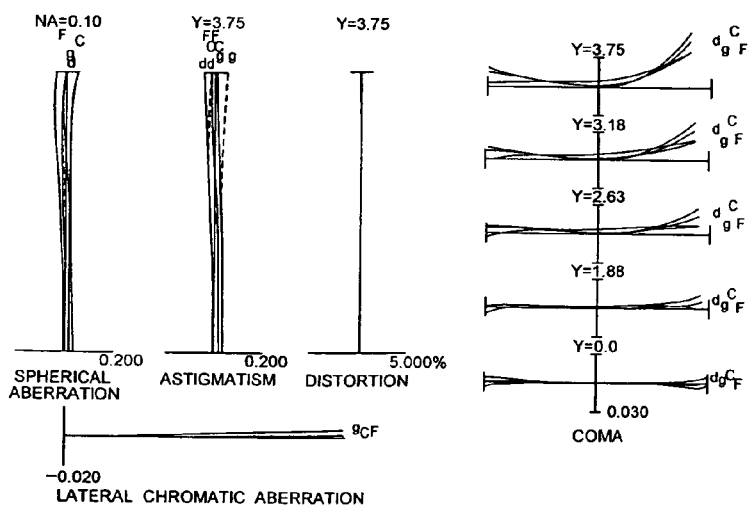

FIGS. 17A, 17B, and 17C are graphs showing various aberrations of the zoom lens system according to Example 6 focusing on infinity in which FIG. 17A shows various aberrations in the wide-angle end state, FIG. 17B shows various aberrations in the intermediate focal length state, and FIG. 17C shows various aberrations in the telephoto end state. FIGS. 18A, 18B, and 18C are graphs showing various aberrations of the zoom lens system according to Example 6 focusing on a close object in which FIG. 18A shows various aberrations in the wide-angle end state, FIG. 18B shows various aberrations in the intermediate focal length state, and FIG. 18C shows various aberrations in the telephoto end state.

As is apparent from the respective graphs, the zoom lens system according to Example 6 shows superb optical performance as a result of good corrections to various aberrations over entire focal length range from the wide-angle end state to the telephoto end state.

EXAMPLE 7

FIG. 19 is a diagram showing a lens configuration of a zoom lens system according to Example 7 of the present application in which W shows a wide-angle end state, M shows an inter mediate focal length state, and T shows a telephoto end state. Reference symbols designating respective lenses used in the following explanations are listed only on the figure representing the wide-angle end state W. In the other focal length states, to list reference symbols is omitted.

The zoom lens system according to Example 7 of the present application is composed of, in order from an object, a first lens group G1 having negative refractive power, and a second lens group G2 having positive refractive power. Upon zooming from a wide-angle end state W to a telephoto end state T, a distance between the first lens group G1 and the second lens group G2 varies.

The first lens group G1 has negative refractive power as a whole and is composed of two lenses which are a negative meniscus lens L11 having a concave surface facing the image plane I side, and a positive meniscus lens L12 having a convex surface facing the object.

The second lens group G2 has positive refractive power as a whole and is composed of a double convex positive lens L21, an aperture stop S for defining an f-number, and a double concave negative lens L22.

Focusing from infinity to a close object is carried out by moving the first lens group G1 along the optical axis.

Between the second lens group G2 and the image plane I, there are provided a low-pass filter P1 for removing higher spatial frequency than the resolution limit of a solid-state imaging device such as a CCD and a cover glass P2 for protecting the imaging device.

Various values associated with a zoom lens system according to Example 7 is listed in Table 7.

TABLE 7

[Specifications]

| | W | M | T |
|---|---|---|---|
| f = | 5.95 | 10 | 16.5 |
| Bf = | 1.05442 | (constant) | |
| FNO = | 3.15 | 4.01 | 5.41 |
| 2ω = | 54.1 | 34.7 | 21.7° |

[Lens Data]

| | r | d | νd | nd |
|---|---|---|---|---|
| 1 | 14.5931 | 1.0000 | 40.38 | 1.806098 |
| *2 | 3.7290 | 2.4050 | | |
| 3 | 7.4828 | 1.5000 | 25.46 | 1.805180 |
| 4 | 14.7371 | (D4) | | |
| *5 | 3.7757 | 2.2000 | 82.56 | 1.497820 |
| 6 | −15.1481 | 0.3760 | | |
| 7 | ∞ | 0.7270 | Aperture Stop S | |
| 8 | −18.2064 | 2.6761 | 24.06 | 1.821140 |
| *9 | 23.1477 | (D9) | | |
| 10 | ∞ | 0.6000 | 64.20 | 1.516800 |
| 11 | ∞ | 0.4000 | | |
| 12 | ∞ | 0.5000 | 64.20 | 1.516800 |
| 13 | ∞ | (Bf) | | |

[Aspherical Data]

Surface Number 2

κ = 0.2705
C4 = 0.00000E+00
C6 = 3.16294E−04
C8 = 1.94737E−05
C10 = −7.65518E−07
C12 = 7.99466E−09

Surface Number 5

κ = 0.5102
C4 = 0.00000E+00
C6 = 1.00000E−10
C8 = 1.00000E−12
C10 = 1.00000E−14
C12 = 1.00000E−16

Surface Number 9

κ = 84.4524
C4 = 0.00000E+00
C6 = 2.69987E−03
C8 = 1.98117E−04
C10 = 4.49525E−05
C12 = −4.06120E−06

[Variable Distances]

| | W | M | T |
|---|---|---|---|
| <Focusing on infinity> | | | |
| f = | 5.95 | 10.0 | 16.5 |
| D0 = | ∞ | ∞ | ∞ |

TABLE 7-continued

| | | | |
|---|---|---|---|
| D4 = | 12.05812 | 4.94409 | 0.82684 |
| D9 = | 6.04394 | 9.01425 | 13.78141 |
| TL = | 31.54060 | 27.39687 | 28.04678 |
| <Focusing on a close object> | | | |
| β = | −0.02810 | −0.04723 | −0.07793 |
| D0 = | 200.0001 | 200.0001 | 200.0001 |
| D4 = | 12.73117 | 5.61714 | 1.49989 |
| D9 = | 6.04394 | 9.01425 | 13.78141 |
| TL = | 32.21365 | 28.06992 | 28.71983 |

[Values for Conditional Expressions]

(1): Da/fw = 0.0627
(2): fF/fR = −0.524
(3): nd = 1.82114
(4): vd = 24.06

Figure 20A:
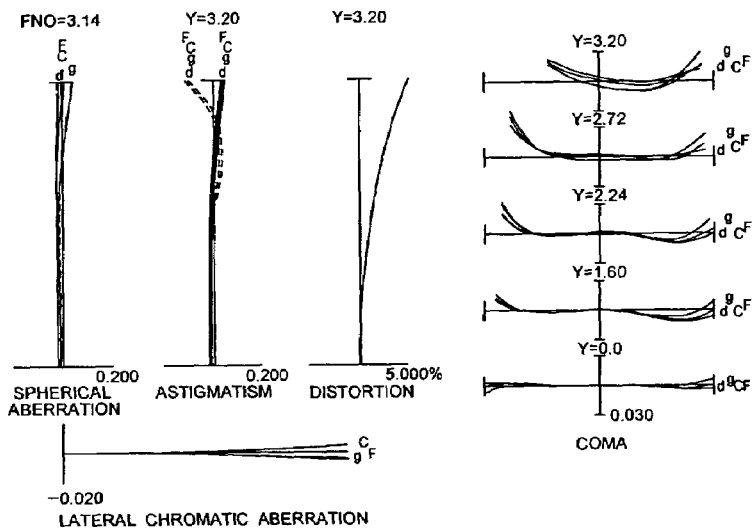
Figure 20B:
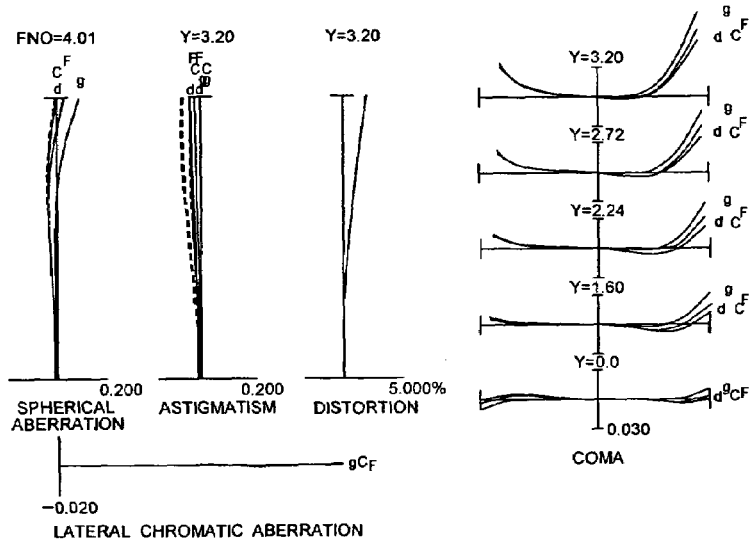
Figure 20C:
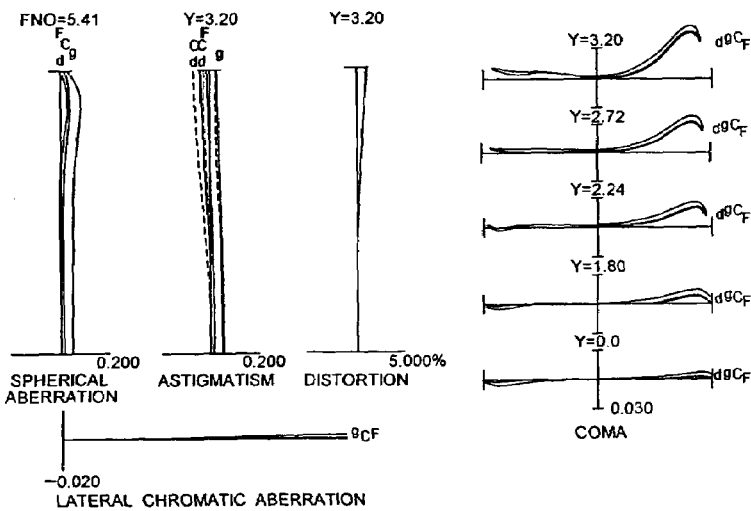
Figure 21A:
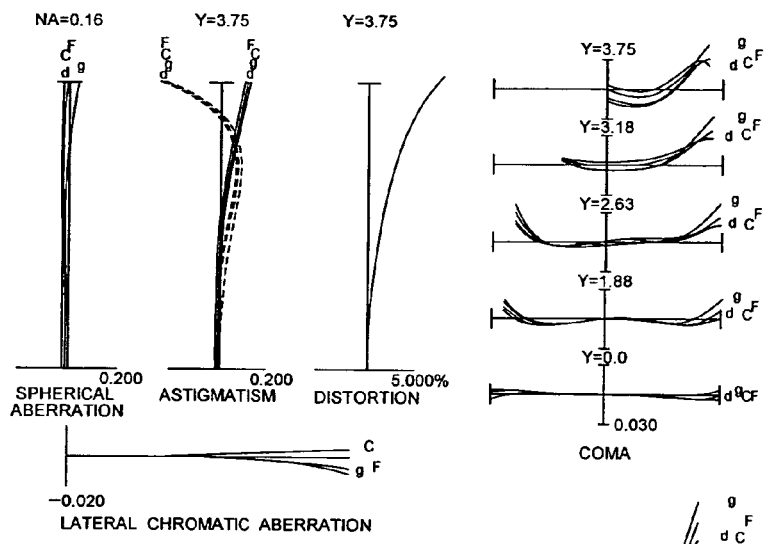
Figure 21B:
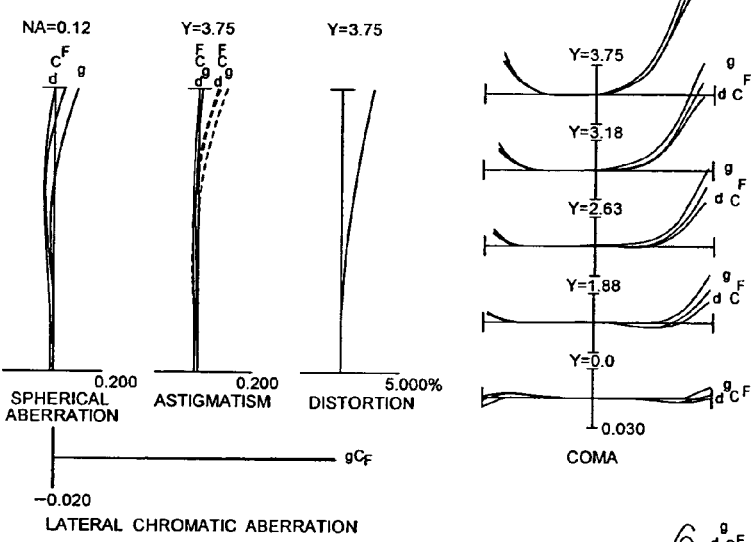
Figure 21C:
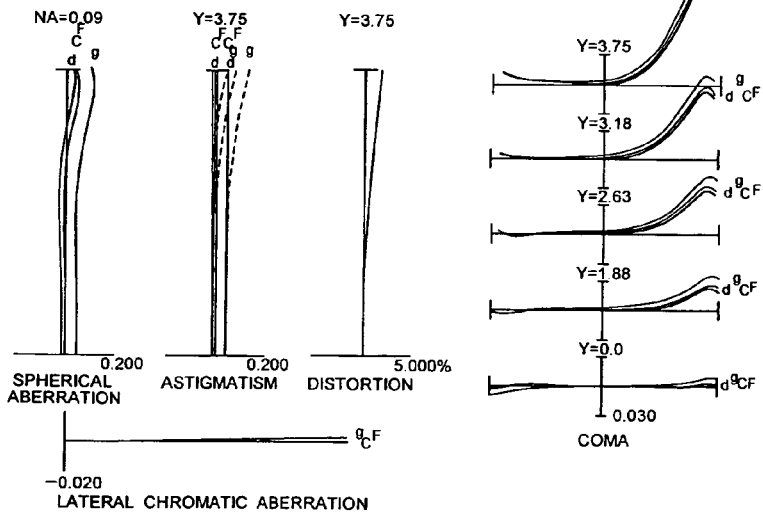

FIGS. 20A, 20B, and 20C are graphs showing various aberrations of the zoom lens system according to Example 7 focusing on infinity in which FIG. 20A shows various aberrations in the wide-angle end state, FIG. 20B shows various aberrations in the intermediate focal length state, and FIG. 20C shows various aberrations in the telephoto end state. FIGS. 21A, 21B, and 21C are graphs showing various aberrations of the zoom lens system according to Example 7 focusing on a close object in which FIG. 21A shows various aberrations in the wide-angle end state, FIG. 21B shows various aberrations in the intermediate focal length state, and FIG. 21C shows various aberrations in the telephoto end state.

As is apparent from the respective graphs, the zoom lens system according to Example 7 shows superb optical performance as a result of good corrections to various aberrations over entire focal length range from the wide-angle end state to the telephoto end state.

As described above, the present invention makes it possible to provide a zoom lens system capable of excellently correcting various aberrations with accomplishing to be compact, lightweight, and slim upon being retracted.

It is needless to say that although a zoom lens system with a two-lens-group configuration is shown as each Example of the present application, a zoom lens system simply added by a lens group to a two-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system composed of, in order from an object side:
   a first lens group having negative refractive power; and
   a second lens group having positive refractive power, and
   upon zooming from a wide-angle end state to a telephoto end state, a distance between the first lens group and the second lens group varying,
   the first lens group being composed of two lens elements which are, in order from the object, a negative lens having a concave surface facing an image, and a positive lens,
   the second lens group consisting of three lens elements or less and including, in order from the object side, a positive lens, an aperture stop for defining an f-number, and a negative lens component including a negative lens and disposed to the image side of the aperture stop,
   at least one aspherical surface being included in both of the first lens group and the second lens group,
   focusing being carried out by the first lens group, and
   the following conditional expression being satisfied:

$-0.05 < Da/fw < 0.5$ where Da denotes a distance along the optical axis between the image side surface of the most object side positive lens in the second lens group and the aperture stop, and fw denotes a focal length of the zoom lens system in the wide-angle end state.

2. The zoom lens system according to claim 1, wherein a positive lens is disposed to the image side of the negative lens in the negative lens component.

3. The zoom lens system according to claim 1, wherein the following conditional expression is satisfied:

$-0.6 < fF/fR < 0.3$ where fF denotes a focal length of the most object side positive lens in the second lens group, and fR denotes a combined focal length of the lenses disposed from the negative lens component to the image plane.

4. The zoom lens system according to claim 1, wherein the following conditional expressions are satisfied:

$1.68 < nd$ $vd < 40$ where nd denotes refractive index of the negative lens in the negative lens component at d-line (wavelength λ=587.6 nm), and vd denotes Abbe number of the negative lens in the negative lens component at d-line (wavelength λ=587.6 nm).

5. The zoom lens system according to claim 1, wherein the negative lens component is a cemented lens constructed by, in order from the object, a negative lens cemented with a positive lens.

6. A zoom lens system composed of, in order from an object side:
   a first lens group having negative refractive power; and
   a second lens group having positive refractive power, and
   upon zooming from a wide-angle end state to a telephoto end state, a distance between the first lens group and the second lens group varying,
   the first lens group being composed of two lens elements which are, in order from the object side, a negative lens having a concave surface facing an image, and a positive lens,
   the second lens group including, in order from the object, a positive lens, an aperture stop for defining an f-number, and a negative lens component composed of a single negative lens and disposed to the image side of the aperture stop,
   at least one aspherical surface being included in both of the first lens group and the second lens group,
   focusing being carried out by the first lens group, and
   the following conditional expression being satisfied:

$-0.05 < Da/fw < 0.5$ where Da denotes a distance along the optical axis between the image side surface of the most object side positive lens in the second lens group and the aperture stop, and fw denotes a focal length of the zoom lens system in the wide-angle end state.

7. The zoom lens system according to claim 6, wherein a positive lens is disposed to the image side of the negative lens in the negative lens component.

8. The zoom lens system according to claim 6, wherein the following conditional expression is satisfied:

$$-0.6 < fF/fR < 0.3$$

where fF denotes a focal length of the most object side positive lens in the second lens group, and fR denotes a combined focal length of the lenses disposed from the negative lens component to the image plane.

9. The zoom lens system according to claim 6, wherein the following conditional expressions are satisfied:

$$1.68 < nd$$

$$vd < 40$$

where nd denotes refractive index of the negative lens in the negative lens component at d-line (wavelength $\lambda=587.6$ nm), and vd denotes Abbe number of the negative lens in the negative lens component at d-line (wavelength $\lambda=587.6$ nm)

10. A method for forming an image of an object and varying a focal length of a zoom lens system that consists of, in order from an object side, a first lens group having negative refractive power, and a second lens group having positive refractive power, comprising steps of:
   varying the focal length from a wide-angle end state to a telephoto end state by moving a distance between the first lens group and the second lens group,
   providing the first lens group composed of two lens elements which are, in order from the object side, a negative lens having a concave surface facing the image, and a positive lens,
   providing the second lens group which consists of three lens elements or less and includes, in order from the object side, a positive lens, an aperture stop for defining an f-number, and a negative lens component including a negative lens and disposed to the image side of the aperture stop,
   focusing by moving the first lens group, and
   satisfying the following conditional expression:

$$-0.05 < Da/fw < 0.5$$

where Da denotes a distance along the optical axis between the image side surface of the most object side positive lens in the second lens group and the aperture stop, and fw denotes a focal length of the zoom lens system in the wide-angle end state.

11. A method for forming an image of an object and varying a focal length of a zoomlens system that consists of, in order from an object side, a first lens group having negative refractive power, and a second lens group having positive refractive power, comprising steps of:
   varying the focal length from a wide-angle end state to a telephoto end state by moving a distance between the first lens group and the second lens group,
   providing the first lens group composed of two lens elements which are, in order from the object side, a negative lens having a concave surface facing the image, and a positive lens,
   providing the second lens group which includes, in order from the object side, a positive lens, an aperture stop for defining an f-number, and a negative lens component composed of a single negative lens and disposed to the image side of the aperture stop,
   focusing by moving the first lens group, and
   satisfying the following conditional expression:

$$-0.05 < Da/fw < 0.5$$

where Da denotes a distance along the optical axis between the image side surface of the most object side positive lens in the second lens group and the aperture stop, and fw denotes a focal length of the zoom lens system in the wide-angle end state.

12. A zoom lens system composed of, in order from an object side:
   a first lens group having negative refractive power; and
   a second lens group having positive refractive power, and
   upon zooming from a wide-angle end state to a telephoto end state, a distance between the first lens group and the second lens group varying,
   the first lens group being composed of two lens elements which are, in order from the object side, a negative lens having a concave surface facing an image, and a positive lens,
   the second lens group consisting of three lens elements or less and including, in order from the object side, a positive lens, an aperture stop for defining an f-number, and a negative lens group,
   the negative lens group including a negative lens disposed to the image side of the aperture stop, and
   the following conditional expressions being satisfied:

$$-0.05 < Da/fw < 0.5$$

$$1.808090 \leq nd$$

$$vd < 40$$

$$-0.6 < fF/fR < 0.3$$

where Da denotes a distance along the optical axis between the image side surface of the most object side positive lens in the second lens group and the aperture stop, fw denotes a focal length of the zoom lens system in the wide-angle end state, nd denotes refractive index of the negative lens in the negative lens group at d-line (wavelength $\lambda=587.6$ nm), and vd denotes Abbe number of the negative lens in the negative lens group at d-line (wavelength $\lambda=587.6$ nm), fF denotes a focal length of the most object side positive lens in the second lens group, and fR denotes a focal length of the lenses disposed from the negative lens to the image plane.

13. The zoom lens system according to claim 12, wherein a positive lens is disposed to the image side of the negative lens in the negative lens group.

14. A zoom lens system composed of, in order from an object side:
   a first lens group having negative refractive power; and
   a second lens group having positive refractive power, and
   upon zooming from a wide-angle end state to a telephoto end state, a distance between the first lens group and the second lens group varying,
   the first lens group being composed of two lens elements which are, in order from the object side, a negative lens having a concave surface facing an image, and a positive lens,
   the second lens group consisting of, in order from the object side, a positive lens, an aperture stop for defining an f-number, and a negative lens component,
   the negative lens component being a single lens or a cemented lens,
   at least one aspherical surface being included in both of the first lens group and the second lens group, and
   the following conditional expression being satisfied:

$$-0.05 < Da/fw < 0.5$$

where Da denotes a distance along the optical axis between the image side surface of the most object side positive lens in the second lens group and the aperture stop, and fw denotes a focal length of the zoom lens system in the wide-angle end state.

15. The zoom lens system according to claim 14, wherein the following conditional expressions are satisfied:

$$1.68 < nd$$

$$vd < 40$$

where nd denotes refractive index of the negative lens in the negative lens component at d-line (wavelength $\lambda$=587.6 nm), and vd denotes Abbe number of the negative lens in the negative lens component at d-line (wavelength $\lambda$=587.6 nm)

16. A zoom lens system composed of, in order from an object side:
   a first lens group having negative refractive power; and
   a second lens group having positive refractive power, and
   upon zooming from a wide-angle end state to a telephoto end state, a distance between the first lens group and the second lens group varying,
   the first lens group being composed of two lens elements which are, in order from the object side, a negative lens having a concave surface facing an image, and a positive lens,
   the second lens group consisting of three lens elements or less and including, in order from the object side, a positive lens, an aperture stop for defining an f-number, and a negative lens group,
   the negative lens group including a negative lens is disposed to the image side of the aperture stop,
   an f-number of the zoom lens system in the wide-angle end state being smaller than an f-number of the zoom lens system in the telephoto end state,
   at least one aspherical surface being included in both of the first lens group and the second lens group, and
   the following conditional expression being satisfied:

$$-0.05 < Da/fw < 0.5$$

where Da denotes a distance along the optical axis between the image side surface of the most object side positive lens in the second lens group and the aperture stop, fw denotes a focal length of the zoom lens system in the wide-angle end state.

17. A method for forming an image of an object and varying a focal length of a zoom lens system that consists of, in order from an object side, a first lens group having negative refractive power, and a second lens group having positive refractive power, comprising steps of:
   varying the focal length from a wide-angle end state to a telephoto end state by moving a distance between the first lens group and the second lens group;
   providing the first lens group composed of two lens elements which are, in order from the object side, a negative lens having a concave surface facing the image, and a positive lens;
   providing the second lens group which consists of three lens elements or less and includes three aspherical surfaces or less;
   providing the second lens group which includes, in order from the object side, a positive lens, an aperture stop for defining an f-number, and a negative lens group;
   providing the negative lens group which includes a negative lens; and
   satisfying the following conditional expression:

$$-0.05 < Da/fw < 0.5$$

where Da denotes a distance along the optical axis between the image side surface of the most object side positive lens in the second lens group and the aperture stop, and fw denotes a focal length of the zoom lens system in the wide-angle end state.

18. The method for forming the image according to claim 17, wherein the following conditional expressions are satisfied:

$$1.68 < nd$$

$$vd < 40$$

where nd denotes refractive index of the negative lens in the negative lens group at d-line (wavelength $\lambda$=587.6 nm), and vd denotes Abbe number of the negative lens in the negative lens group at d-line (wavelength $\lambda$=587.6 nm).

19. The method for forming the image according to claim 17, wherein the negative lens group is a cemented lens constructed by, in order from the object side, a negative lens cemented with a positive lens.

20. A method for forming an image of an object and varying a focal length of a zoom lens system that includes, in order from an object side, a first lens group having negative refractive power, and a second lens group having positive refractive power, comprising steps of:
   varying the focal length from a wide-angle end state to a telephoto end state by moving a distance between the first lens group and the second lens group,
   providing the first lens group composed of two lens elements which are, in order from the object side, a negative lens having a concave surface facing the image, and a positive lens,
   providing the negative lens of the first lens group which has an aspherical surface on an image side,
   providing the second lens group which includes, in order from the object side, a positive lens, an aperture stop for defining an f-number, and a negative lens component composed of a single negative lens, and
   satisfying the following conditional expression:

$$-0.05 < Da/fw < 0.5$$

where Da denotes a distance along the optical axis between the image side surface of the most object side positive lens in the second lens group and the aperture stop, and fw denotes a focal length of the zoom lens system in the wide-angle end state.

21. The method for forming the image according to claim 20, wherein at least one aspherical surface is included both of the first lens group and the second lens group.

22. The method for forming the image according to claim 20, wherein focusing is carried out by the first lens group.

* * * * *